United States Patent

Hayashi et al.

[11] Patent Number: 6,027,617
[45] Date of Patent: Feb. 22, 2000

[54] GAS REACTOR FOR PLASMA DISCHARGE AND CATALYTIC ACTION

[75] Inventors: Yuji Hayashi, Inagi, Japan; Steven L. Suib; Hiroshige Matsumoto, both of Storrs, Conn.; Masao Hiyane, Yokohama; Shuji Tanabe, Nagasaki, both of Japan

[73] Assignees: Fujitsu Limited, Kawasaki; Honda Giken Kogyo Kabushiki Kaisha, Tokyo; Hokushin Corporation, Yokohama, all of Japan; The University of Connecticut, Storrs, Conn.

[21] Appl. No.: 08/888,834

[22] Filed: Jul. 7, 1997

Related U.S. Application Data

[63] Continuation-in-part of application No. 08/702,386, Aug. 14, 1996, Pat. No. 5,817,218.

[51] Int. Cl.[7] ....................................................... H05F 3/00
[52] U.S. Cl. ..................... 204/170; 204/164; 315/111.21; 422/168
[58] Field of Search ..................... 134/1.1, 21; 204/164, 204/170; 315/111.21; 422/168

[56] References Cited

U.S. PATENT DOCUMENTS 5,474,747  12/1995  Hayashi et al. .......................... 422/177
5,492,678   2/1996  Ota et al. ................................ 422/174

FOREIGN PATENT DOCUMENTS 42 20 865 A1  2/1993  Germany .

*Primary Examiner*—Jeffrey Stucker
*Attorney, Agent, or Firm*—Armstrong, Westerman, Hattori, McLeland & Naughton

[57] ABSTRACT

A gas reactor includes a dielectric casing made of a dielectric material and forming a first conduit for directing first gas in one direction, a first electrode positioned inside the dielectric casing along a general center thereof and extending in the direction, at least one catalyst layer formed on a surface of the first electrode, and a second electrode surrounding an outer wall of the dielectric casing. The gas reactor further includes a power-supply unit applying AC power between the first electrode and the second electrode to generate glow discharge inside the dielectric casing.

32 Claims, 21 Drawing Sheets

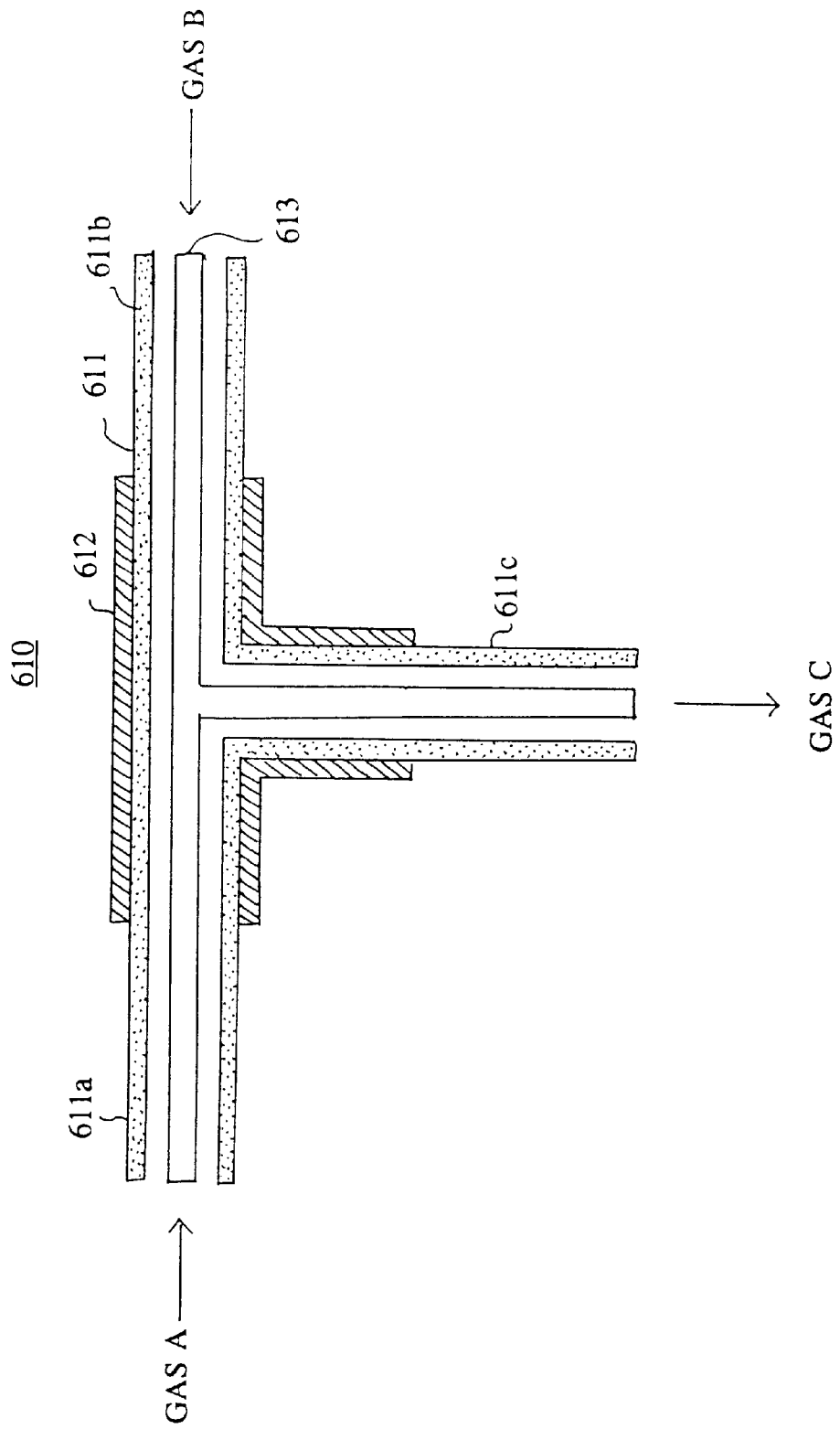

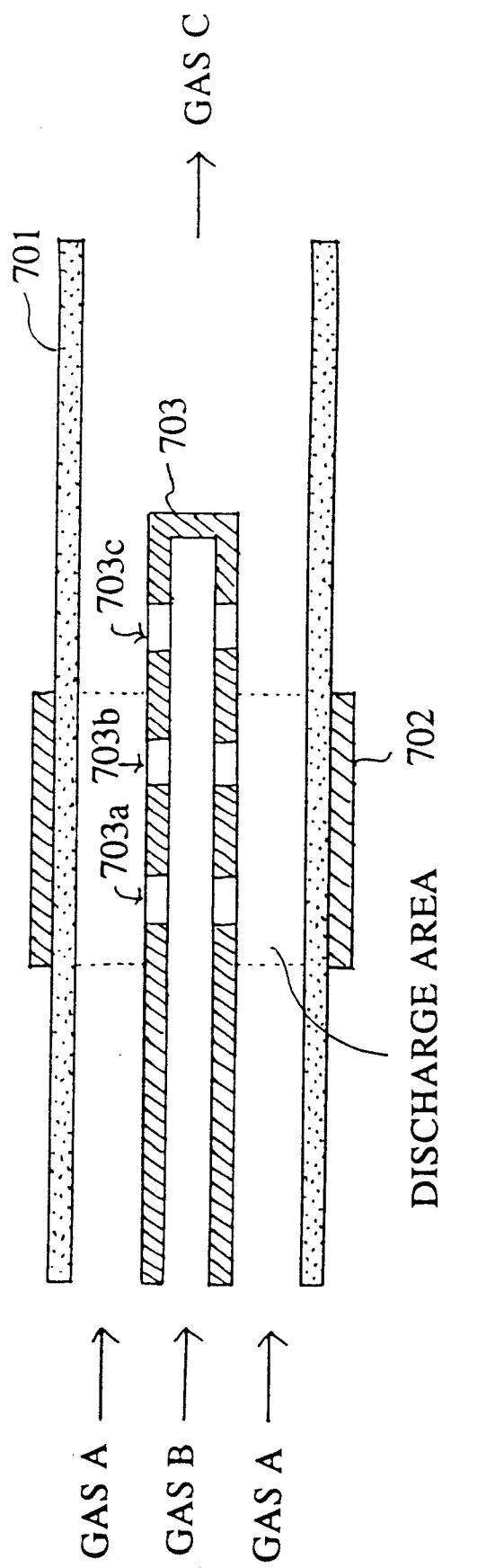

GAS REACTOR FOR PLASMA DISCHARGE AND CATALYTIC ACTION

This application is a continuation-in-part of application Ser. No. 08/702,386, filed Aug. 14, 1996, now U.S. Pat. No. 5,817,218, in the names of Yuji HAYASHI, Steven L. SUIB, Hiroshige MATSUMOTO and Masao HIYANE and entitled "GAS REACTOR".

BACKGROUND OF THE INVENTION

1. Field of the Invention

The present invention generally relates to gas reactors for synthesizing a or decomposing a gas, and particularly relates to a gas reactor for synthesizing a gas or decomposing a gas based on plasma discharge and catalyticaction.

2. Description of the Related Art

In today's highly industrialized societies, various pollutants pose threats to human health. Examples of such pollutants include pollutant gases such as $NO_x$, $CO_x$, $SO_x$, etc., emitted from automobile engines. These and other pollutant gases need to be decomposed into innocuous gases prior to the release to the atmosphere in order to prevent resulting health problems.

U.S. Pat. Nos. 5,474,747 and No. 5,492,678 issued to one of the inventors of the present invention and to other co-inventors address the above need by presenting a gas purifier which effectively decomposes pollutant gases based on a synergy effect of plasma discharge and catalytic action. U.S. Pat. No. 5,474,747 discloses a gas purifier comprising reeds provided with a catalyst such as rhodium. Between the reeds, a glow discharge is generated to create plasma action which decomposes gases synergically with catalytic action. U.S. Pat. No. 5,492,678 discloses a gas purifier which utilizes the same principle of the synergy effect between the plasma action and the catalytic action but employs a rotating fan configuration to pursue further effective gas purification. This fan has blades (or at least one blade) provided with a layer of catalyst, and a glow discharge is generated at a gap between the blades and an inner wall of the housing of the fan.

The gas purifiers described above are specifically designed for decomposition of gases. However, it has been found that the combination of plasma action and catalytic action can be used for effectively synthesizing a gas from different gases. That is, the synergy effect of plasma action and catalytic action can be used not only for the decomposition of gases but also for the synthesis of gases.

Accordingly, there is a need for a gas reactor which has an appropriate configuration for gas synthesis based on the synergy effect of plasma action and catalytic action.

SUMMARY OF THE INVENTION

Accordingly, it is a general object of the present invention to provide the need described above.

It is another and more specific object of the present invention to provide a gas reactor which has an appropriate configuration for gas synthesis based on the synergy effect of plasma and catalytic action.

In order to achieve the above objects according to the present invention, a gas reactor includes a dielectric casing made of a dielectric material and forming a first conduit for directing a first gas in one direction, a first electrode positioned inside the dielectric casing along a general center thereof and extending in the direction, at least one catalyst layer formed on a surface of the first electrode, and a second electrode surrounding an outer wall of the dielectric casing. The gas reactor further includes a power-supply unit applying AC power between the first electrode and the second electrode to generate a glow discharge inside the dielectric casing.

In the gas reactor described above, the glow discharge is generated between the first electrode and an inner wall of the dielectric casing. Since the dielectric casing is made of a dielectric material, a stable and uniform glow discharge is easily maintained inside the casing. At least one catalyst layer formed on the surface of the first electrode can include a plurality of different catalysts to facilitate excitation of different gases when the first gas is a mixture of the different gases. Also, at least one catalyst layer can include one or more catalysts for activation of the first gas excited by a synergistic effect between the glow discharge and the catalyst action, and such an activated first gas can be mixed with a second gas to effect a further gas reaction.

Other objects and further features of the present invention will be apparent from the following detailed description when read in conjunction with the accompanying drawings.

BRIEF DESCRIPTION OF THE DRAWINGS

FIG. 24 is an illustrative drawing showing a variation of the seventh embodiment of the present invention; and FIG. 25 is an illustrative drawing showing a gas reactor according to an eighth embodiment of the present invention.

DESCRIPTION OF THE PREFERRED EMBODIMENTS

In the following, embodiments of the present invention will be described with reference to the accompanying drawings.

Figure 1:
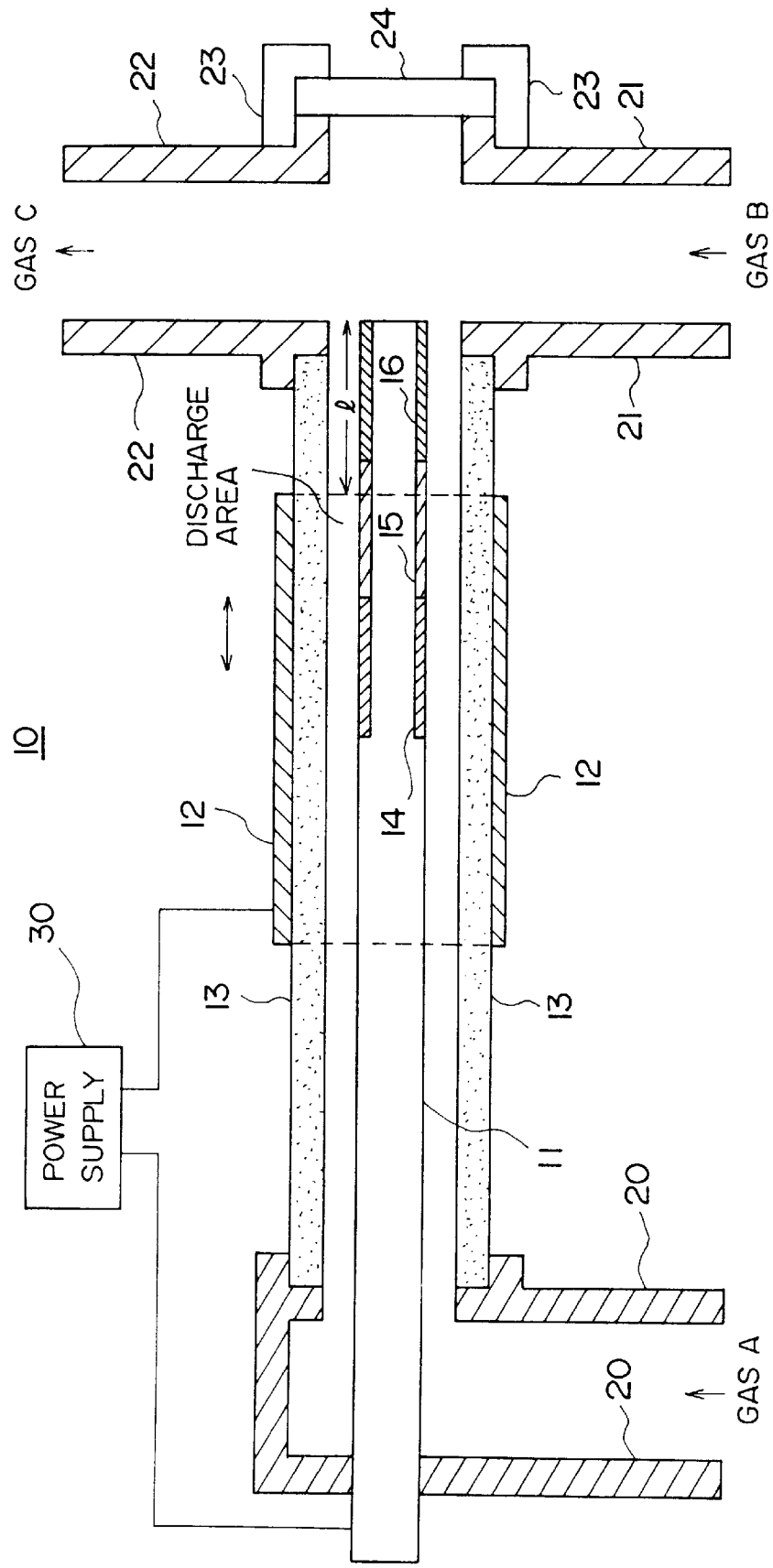
FIG. 1 is an illustrative drawing showing a configuration of a gas reactor according to a first embodiment of the present invention.

FIG. 1 is an illustrative drawing showing a configuration of a gas reactor according to the first embodiment of the present invention.

In FIG. 1, a gas reactor 10 comprises an inner electrode 11, an outer electrode 12, a casing 13, a first catalyst 14, a second catalyst 15, a third catalyst 16, a gas-injection conduit 20 for conducting gas A, a gas-injection conduit 21 for conducting gas B, a gas-emission conduit 22 for conducting gas C, a window holder 23, a filter 24, and a power supply 30.

The inner electrode 11 and the outer electrode 12 are made from copper, for example, and the power supply 30 supplies AC power between the inner electrode 11 and the outer electrode 12 to actuate a glow discharge. The casing 13 is a circular tube made from a dielectric material such as glass. As shown in FIG. 1, the inner electrode 11 is a rod incorporated in an inner space of the casing 13. The outer electrode 12 has a circular tube shape surrounding the casing 13, and is movable in a direction shown by an arrow in FIG. 1.

When AC power is applied between the inner electrode 11 and the outer electrode 12 by the power supply 30, a glow discharge is generated between the inner electrode 11 and the outer electrode 12 via the casing 13. That is, the glow discharge occurs at a gap between the inner electrode 11 and the casing 13 in an area surrounded by the casing 13. This area is shown in FIG. 1 as a discharge area.

Gas A is injected through the gas-injection conduit 20, and is directed to the inner space of the casing 13, where the gas A is subjected to the glow discharge.

The inner electrode 11 is provided with coating layers of at least two different metal catalysts. One of the metal catalysts is used for excitation of the gas A, and the other is used for activation of the gas A. More than one metal catalyst may be provided for the excitation of gas A, and, also, more than one metal catalyst may be provided for activation of gas A. In FIG. 1, two metal catalyst layers for excitation, i.e., the first catalyst 14 and the second catalyst 15, are provided on the inner electrode 11, and one metal catalyst layer for activation, i.e., the third catalyst 16, is provided on the inner electrode 11 at one end of the rod.

The first catalyst 14 and the second catalyst 15 are used for the excitation of different gases. For example, gas A may be a mixture of two different gases such as methane and $CO_2$. Rhodium may be a suitable catalyst for the excitation of methane, and nickel may be a suitable catalyst for the excitation of $CO_2$. In this manner, when the injected gas A is a mixture of different gases, provision of different catalysts suitable for the excitation of these gases should prove to be beneficial.

The gas A excited by the glow discharge with help from the first catalyst 14 and the second catalyst 15 flows from the discharge area into a space where the third catalyst 16 is provided. With help of the third catalyst 16, the gas A at excited levels is activated for chemical reaction.

Gas B is injected through the gas-injection conduit 21, and meets with gas A at an intersection where the excited and activated gas A flows into gas B from the inner space defined by the casing 13. Here, chemical reaction between gas A and gas B occurs, and a resulting gas C is directed through the gas-emission conduit 22.

As previously mentioned, the outer electrode 12 is movable in the direction indicated by the arrow in FIG. 1. This movement is used for an adjustment of a length l shown in FIG. 1. Here, the length l is a distance between the end of the discharge area and the intersection where gas A is mixed with gas B. The gas A excited in the discharge area has an inherent excitation lifetime, so that the adjustment of length l by the movement of the outer electrode 12 can control the percentage of the excited gas A which reaches the intersection to meet gas B while it is at excited levels.

The filter 24 is provided beside the intersection where gas A meets gas B, such that the discharge area can be observed through the filter 24. The filter 24 is made of KBr, through which near-infrared radiation from the glow discharge is observed by an externally provided device (not shown). Based on a spectrum analysis of the near-infrared radiation, factors such as the lifetime of a particular excited gas can be measured. Such factors are fedback for adjustment of the length l.

An example of gas reactions effected by the gas reactor 10 according to the first embodiment of the present invention includes the synthesis of methanol from methane and oxygen. In this case, methane is gas A of FIG. 1, and oxygen is gas B. Methane injected to the gas reactor 10 is excited and activated and mixed with oxygen, thereby effecting the synthesis of methanol.

Figure 2:
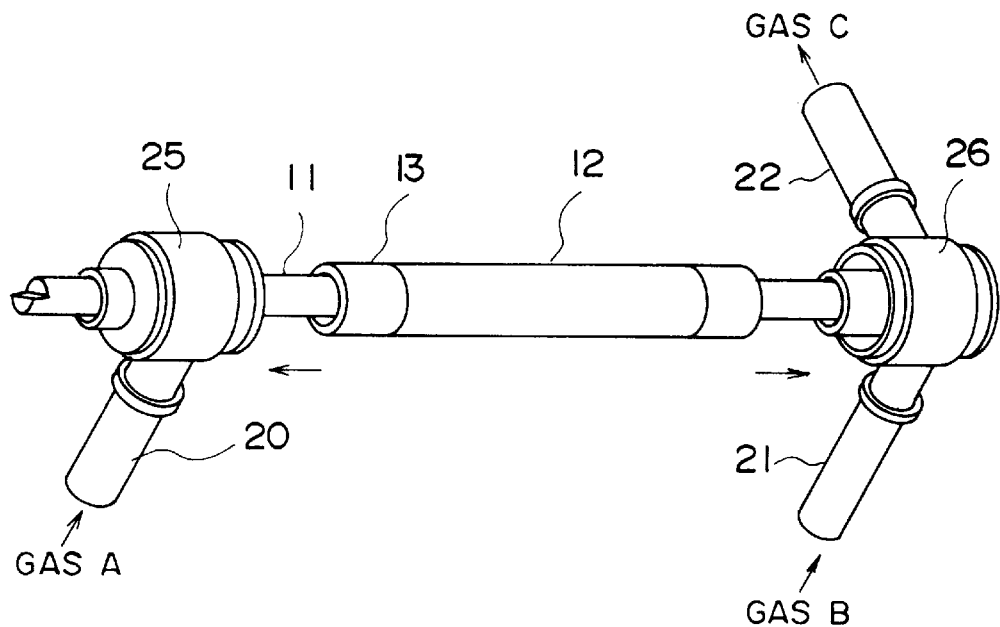
FIG. 2 is an expanded view of the gas reactor of FIG. 1.

FIG. 2 is an expanded view of the gas reactor 10. In FIG. 2, the gas-injection conduit 20, the gas-injection conduit 21, and the gas-emission conduit 22 are formed from circular pipes commonly used in the industrial field. A joint part 25 is used for connecting the gas-injection conduit 20 with the casing 13, and a joint part 26 is used for connecting the gas-injection conduit 21, the casing 13, and the gas-emission conduit 22. FIG. 2 shows a disassembled gas reactor 10 in which the joint part 25 and the joint part 26 are disconnected from the casing 13 in directions shown by arrows.

The joint part 25 and the joint part 26 are also commonly available in industry. The combination of the gas-injection conduit 20, the gas-injection conduit 21, the gas-emission conduit 22, the joint part 25, and the joint part 26 provide enough precision for the gas reactor 10, thereby avoiding gas leakage or the like.

Figure 3A:
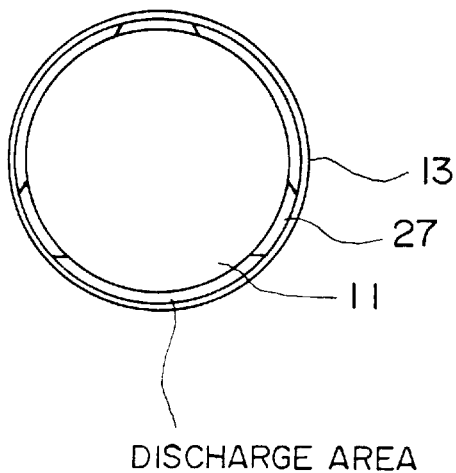
FIGS. 3A and 3B are cross-sectional views of the gas reactor of FIG. 1 taken along a plane perpendicular to an extension of a casing at a discharge area.
Figure 3B:
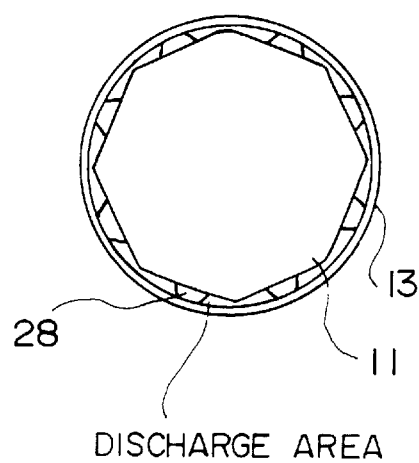

FIGS. 3A and 3B are cross-sectional views of the gas reactor 10 taken along a plane perpendicular to the extension of the casing 13 in the discharge area. In FIGS. 3A and 3B, the outer electrode 12 is omitted for clarity of the figures.

As shown in FIG. 3A, the inner electrode 11 may have a circular cross section, and spacers 27 may be provided between the inner electrode 11 and the casing 13 to ensure a uniform gap (discharge area) around the circle. The spacers 27 may not be necessary, and the positioning of the inner electrode 11 inside the casing 13 may rely on the precision of the joint part 25 (FIG. 2) supporting the inner electrode 11.

FIG. 3B shows a variation of the inner electrode 11. As shown in the figure, the inner electrode 11 may have a cross section of a regular-polygon shape, and spacers 28 may be provided on edges of the regular polygon. As in FIG. 3A, the spacers 28 may not be necessary, and the inner electrode 11 may be mainly supported inside the casing 13 by the joint part 25.

With reference to FIG. 1 again, the gas-injection conduit 21 for injecting gas B may not be necessary. Especially, when the gas reactor 10 is used as a gas reactor for decomposing gases, the gas reactor 10 may be provided only with one gas-injection conduit and one gas-emission conduit. In the following, a serial or parallel connection of such gas reactors will be described.

Figure 4:
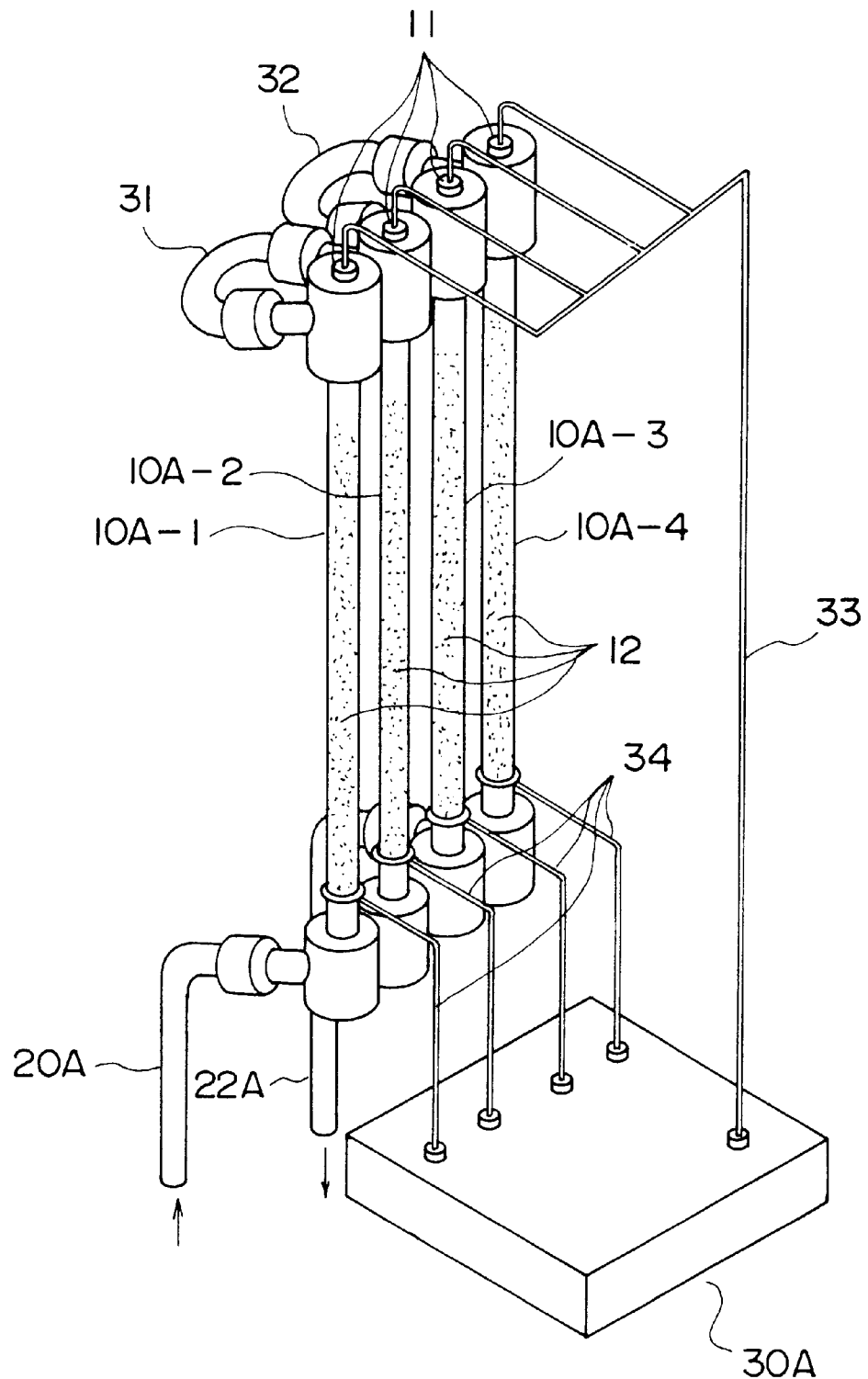
FIG. 4 is an illustrative drawing showing a serial connection of gas reactors.
Figure 5:
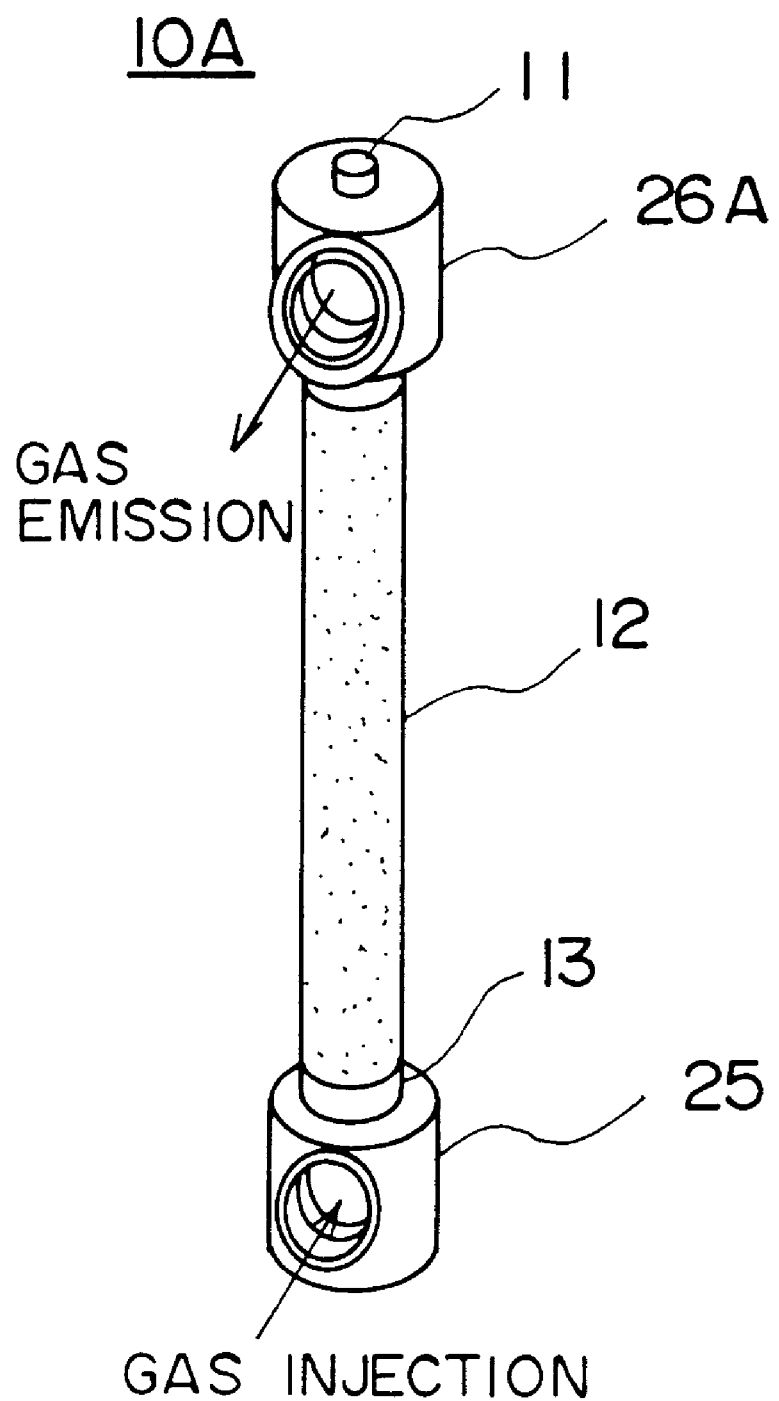
FIG. 5 is an illustrative drawing showing a gas reactor of FIG. 4.

FIG. 4 is an illustrative drawing showing a serial connection of gas reactors 10A. FIG. 5 is an illustrative drawing showing gas reactor 10A.

The gas reactor 10A of FIG. 5 differs from the gas reactor 10 of FIG. 1 only in that the gas-injection conduit 20, the gas-injection conduit 21, and the gas-emission conduit 22 are removed, and that a joint part 26A having only a gas-emission hole (or opening) replaces the joint part 26 having a gas-emission hole (or opening) and a gas-injection hole (or opening).

In FIG. 4, the gas reactors 10A-1 through 10A-4 (the same type as the gas reactor 10A) are connected in series via a connecting conduit 31, a connecting conduit 32, and another connecting conduit (not shown). A gas-injection conduit 20A is connected to the gas reactor 10A-1, and the gas reactor 10A-1 and the gas reactor 10A-2 are connected via the connecting conduit 31. The gas reactor 10A-2 and the gas reactor 10A-3 are connected via another connecting conduit, which cannot be seen from the viewpoint of the figure. The gas reactor 10A-3 is connected to the gas reactor 10A-4 through the connecting conduit 32, and the gas reactor 10A-4 is provided with a gas-emission conduit 22A.

Each of the outer electrodes 12 of the gas reactors 10A-1 through 10A-4 is connected to a respective lead 34 provided from a power supply 30A. Also, a common lead 33 extends from the power supply 30A, and is connected to each of the inner electrodes 11 of the gas reactors 10A-1 through 10A-4. The power supply 30A provides AC power between the inner electrodes 11 and the outer electrodes 12 to generate a glow discharge.

Gas injected from the gas-injection conduit 20A flows through the gas reactors 10A-1 through 10A-4 while gas reactions take place therein. Then, synthesized gas or decomposed gas is emitted from the gas-emission conduit 22A.

In the configuration of FIG. 5, gas flows through multiple stages of gas reactions, so that the efficiency of gas decomposition or gas synthesis can be boosted or increased. A gas conversion rate in the gas reaction by a single gas reactor 10A is relatively high compared to related-state-of-the-art techniques. As high as it may be, the gas conversion rate of the injected gas is no more than a 20% conversion rate, for example. The serial connection of the gas reactor 10A allows a much higher conversion rate by subjecting injected gas to the multiple stages of the gas reactions.

Figure 6:
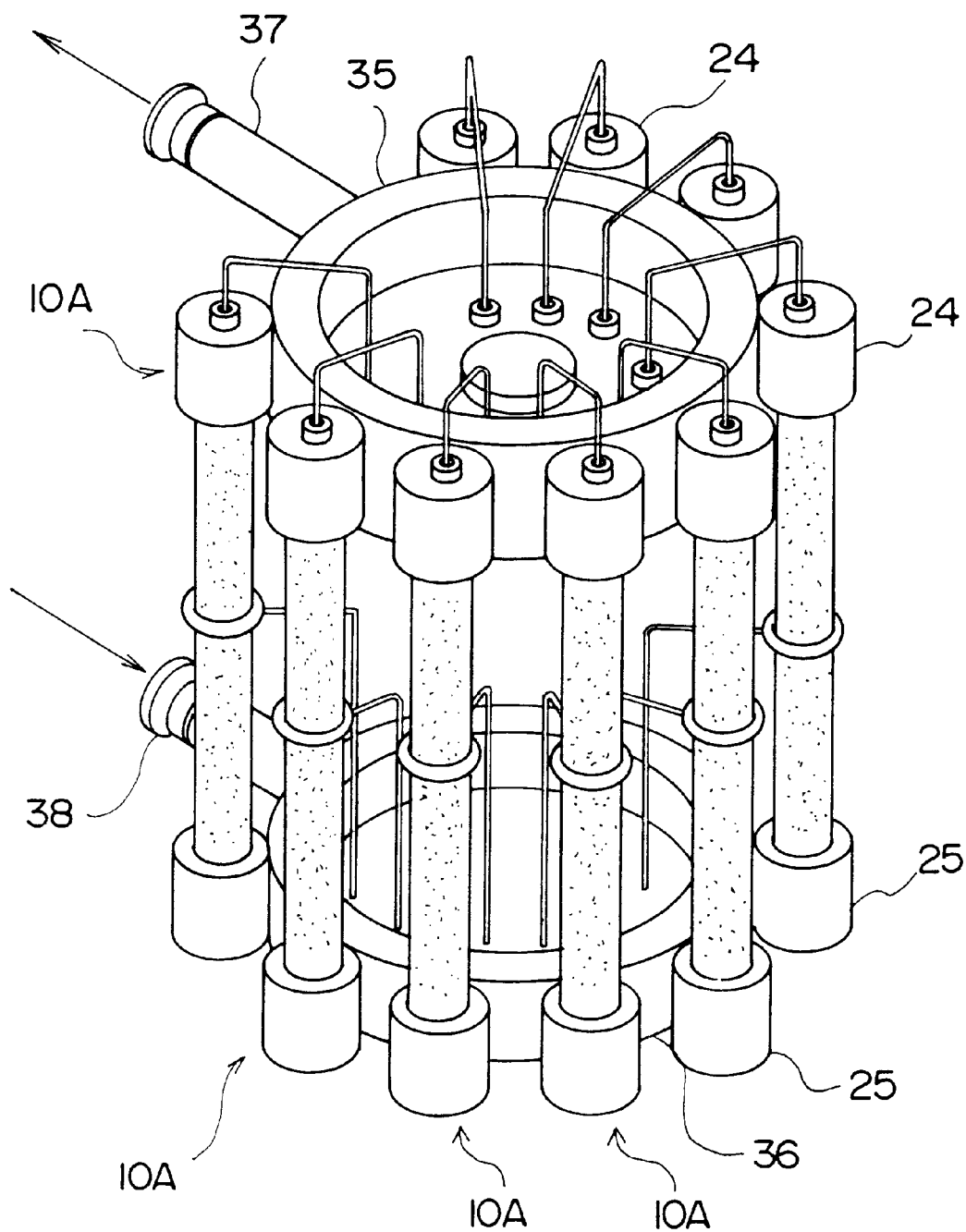
FIG. 6 is an illustrative drawing showing a parallel connection of the gas reactors of FIG. 5.

FIG. 6 is an illustrative drawing showing a parallel connection of the gas reactors 10A.

In FIG. 6, a plurality of the gas reactors 10A are connected in parallel between a joint conduit 35 and a joint conduit 36. The joint conduit 35 and the joint conduit 36 have a circular shape. The joint conduit 36 is connected to the joint parts 25 of the gas reactors 10A such that an inner space of the joint conduit 36 is connected to the inner spaces of the joint parts 25. The joint conduit 35 is connected to the joint parts 24 of the gas reactors 10A such that an inner space of the joint conduit 35 is connected to the inner spaces of the joint parts 24.

The joint conduit 35 and the joint conduit 36 are connected to a gas-emission conduit 37 and a joint conduit 36, respectively. Gas injected through the gas-injection conduit 38 is supplied to the gas reactors 10A via the joint conduit 36, and flows through the gas reactors 10A where gas reaction takes place. Resulting gas is led or directed to the joint conduit 35, and emitted from the gas-emission conduit 37.

Accordingly, the configuration of FIG. 35 allows a large amount of gas to be subjected to gas reaction without using a gas reactor having a large size.

As shown in FIG. 4 and FIG. 6, the gas reactors 10A can be arranged in various configurations such as a serial or a parallel connection. Since the gas reactor 10A can be connected with other gas reactors 10A in a flexible arrangement, the combined gas reactor can be tailored to various needs for gas reaction processes.

Figure 7:
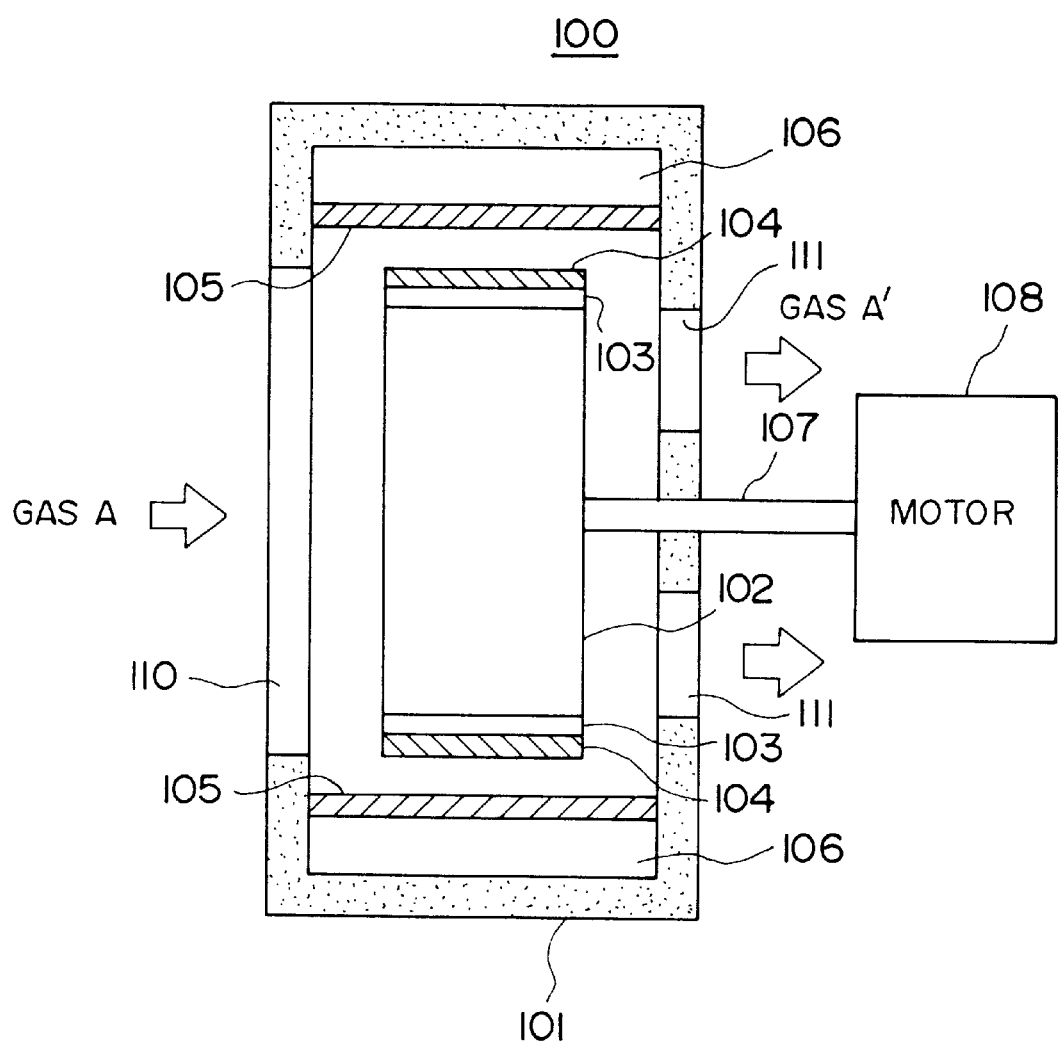
FIG. 7 is an illustrative drawing showing a configuration of a gas reactor according to a second embodiment of the present invention.

FIG. 7 is an illustrative drawing showing a configuration of a gas reactor according to a second embodiment of the present invention. The second embodiment of the present invention is an improvement over the gas cleaning equipment disclosed in U.S. Pat. No. 5,492,678.

In FIG. 7, a gas reactor 100 comprises a casing 101, a rotor 102 housed in the casing 101, a plurality of blades 103 provided on a perimeter of the rotor 102, a catalyst layer 104 on a tip of each blade 103, an outer electrode 105 provided inside the casing 101 to surround the rotor 102, an insulator 106 placed between the outer electrode 105 and an inner wall of the casing 101, a shaft 107, a motor 108, a gas-injection opening 110, and a gas-emission opening 111.

Figure 8A:
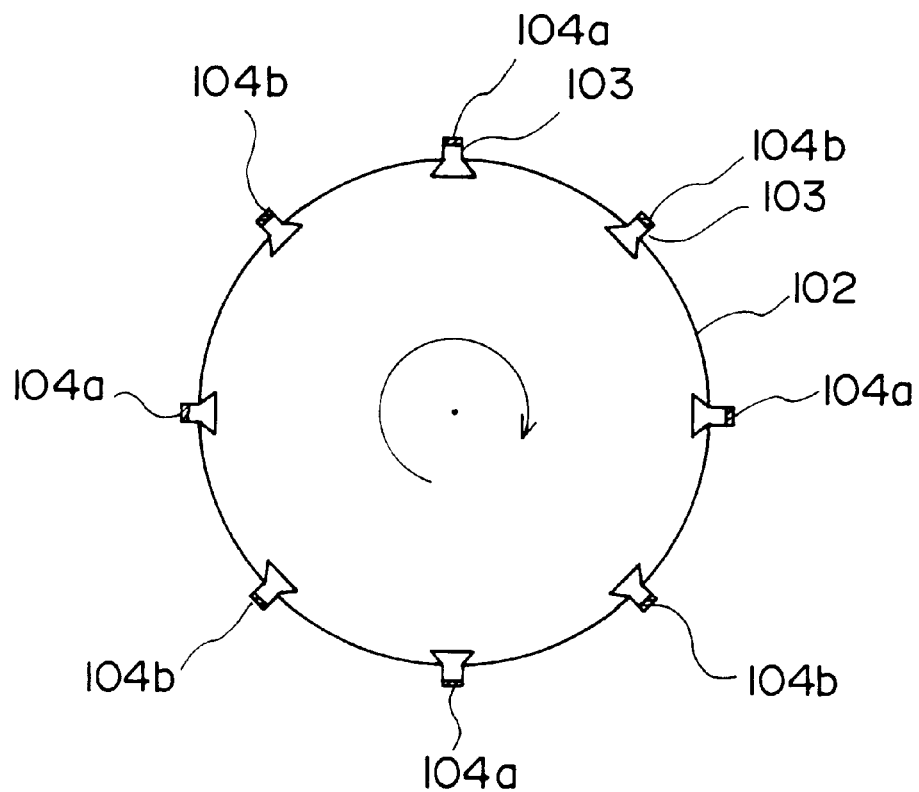
FIG. 8A is an illustrative drawing of a rotor with the plurality of blades when viewed from a direction of a gas flow in FIG. 7.

FIG. 8A is an illustrative drawing of the rotor 102 with the plurality of the blades 103 when viewed from a direction shown by an arrow indicating a flow of gas A in FIG. 7. As shown in FIG. 8A, the rotor 102 has a round shape, and is provided with the plurality of blades 103 on the perimeter thereof. The rotor 102 rotates in a direction indicated by a curved arrow in FIG. 8A.

With reference back to FIG. 7, the rotor 102 is made of a conductive material, and is housed in the casing 101. The motor 108 uses the shaft 107 to rotate the rotor 102 inside the casing 101. Since the motor 108 is provided outside the casing 101 in this configuration, the gas reactor 100 can be easily used for a liquid-state reaction.

The outer electrode 105 has a ring shape to surround the rotor 102, such that a gap is provided between the outer electrode 105 and each of the blades 103. Each blade 103 is formed from a conductive material such as Cu, and has a catalyst layer 104 on the tip thereof. The outer electrode 105 is made of a conductive material such as Pt.

The gas-injection opening 110 is provided at one face of the casing 101 to provide a path through which the gas A flows into the casing 101. The gas-emission opening 111 is provided at an opposite face of the casing 101, so that gas A' generated by gas reaction inside the casing 101 flows out through the gas-emission opening 111.

When AC power is applied between the rotor 102 and the outer electrode 105, a glow discharge is generated between the catalyst layer 104 and the outer electrode 105. The glow discharge working synergistically with the catalytic action brings about an effective gas reaction to convert gas A into gas A'.

Figure 8B:
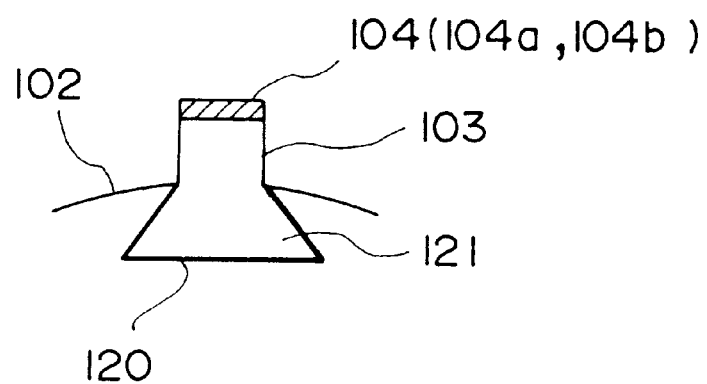
FIG. 8B is an enlarged view of the blade provided on a perimeter of the rotor.

One advantage of the configuration of the second embodiment over the configuration disclosed in U.S. Pat. No. 5,492,678 is removability of the blades 103. FIG. 8B is an enlarged view of a blade 103 provided on the perimeter of the rotor 102. FIG. 8B shows only an example of configurations which provide the removability of the blades 103.

As shown in FIG. 8B, a groove 120 corresponding in shape and size to a base 121 of the blade 103 is formed along the perimeter of the rotor 102. The base 121 of the blade 103 is fit in groove 120 so as to be secured in the perimeter of the rotor 102. The blade 103 can be removed from the rotor 102 by sliding the blade 103 in a direction perpendicular to the sheet of the figure. The base 121 of the blade 103 increases in width towards the bottom. This shape prevents the blade 103 from being detached from the rotor 102 by centrifugal force when the rotor 102 is rotated.

The removability of the blades 103 allows replacement of a set of the blades 103 with another set of blades 103. This makes it possible to use a different catalyst for different gas reactions. Namely, the same gas reactor 100 can be used for different gas reactions by changing a set of the blades 103 to a different set of blades 103 which is suitable for a desired gas reaction. Also, the removability of the blades 103 allows use of an electroplating process for forming the catalyst layer 104 on the tip of the blade 103. Furthermore, because of the removability of the blades 103, byproducts formed on the catalyst layer 104 and the blades 103 can be easily removed by using a chemical process. Such byproducts can also be readily used for analysis of a gas reaction because of the removability.

Another advantage of the configuration of the second embodiment over the configuration disclosed in U.S. Pat. No. 5,492,678 is the provision of a plurality of catalyst layers. As shown in FIG. 8A, two different catalyst layers 104a and 104b are provided one each on a tip of a corresponding blade 103. The blades 103 are arranged such that the same catalyst layer is on a tip of every other blade.

In this configuration, different catalysts can serve for the excitation of different gases in the same manner as in the first embodiment. Namely, when the injected gas A is a mixture of different gases, provision of different catalysts suitable for the excitation of these gases is advantageous. Also, when different catalysts are provided, one catalyst can serve for the excitation of gas and the other catalyst can serve for the activation of the gas. Combinations of the catalyst layer 104a and the catalyst layer 104b include a combination of Pt and $Al_2O_3$, Ru and Cu, Pt and Sn, Pt and Re, $SiO_2$ and $Al_2O_3$, NiO and $Al_2O_3$, etc. For example, the combination of Pt and $Al_2O_3$ is useful for dehydrogenation, and the combinations of Ru and Cu, Pt and Sn, or Pt and Re are useful for oligomerization.

Figure 9A:
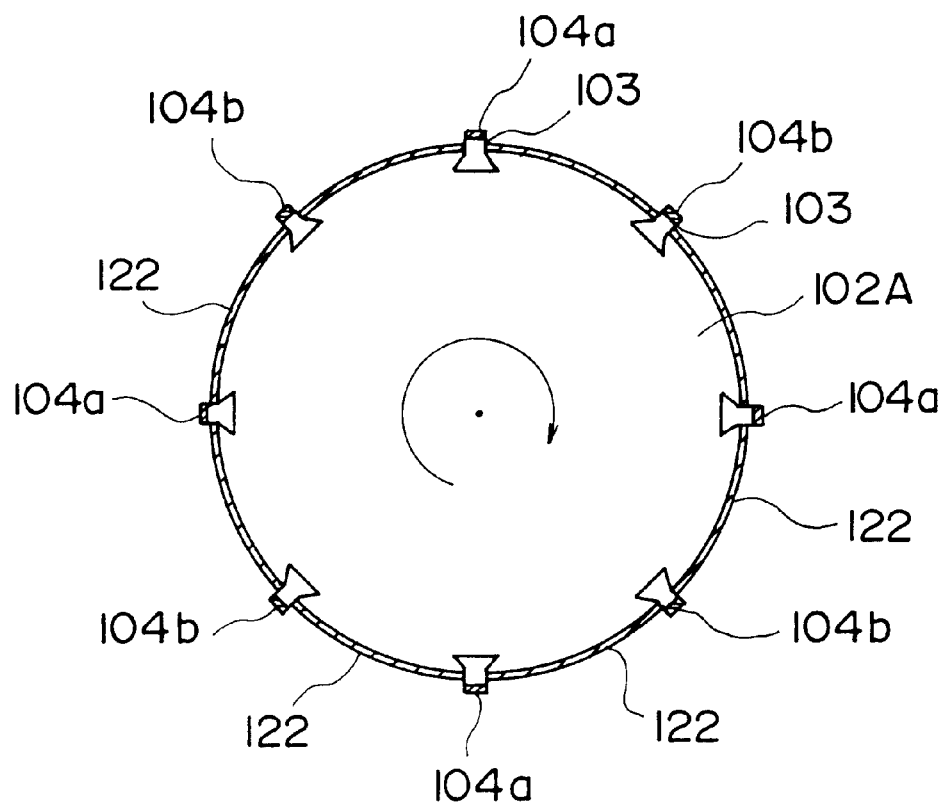
FIGS. 9A and 9B are illustrative drawings showing an alternative configuration of the rotor of the second embodiment.
Figure 9B:
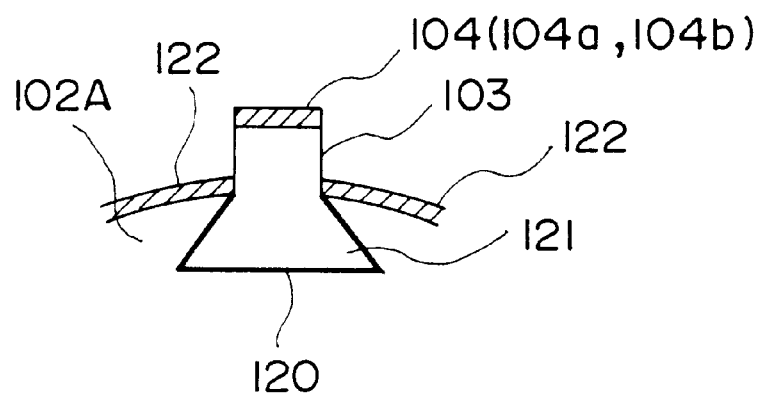

FIGS. 9A and 9B are illustrative drawings showing an alternative configuration of the rotor of the second embodiment. FIG. 9A shows a rotor 102A with the blades 103, and FIG. 9B shows an enlarged partial view of the rotor 102A around one of the blades 103.

As shown in FIGS. 9A and 9B, the rotor 102A is provided with catalyst layers 122 on the perimeter thereof. The catalyst layers 122 are separated from each other by the intervening blades 103, and may be comprised of different catalysts for each interval between the blades 103. In this configuration, it is preferable that the catalyst layers 122 are removable from the blade 103.

As described above, the gas reactor according to the second embodiment of the present invention provides for the blades to be removable from the rotor, so that a different set of the blades can be used for different gas reactions. Also, the removable blades provides for easier formation and elimination of the catalyst layers on the blades.

Figure 10:
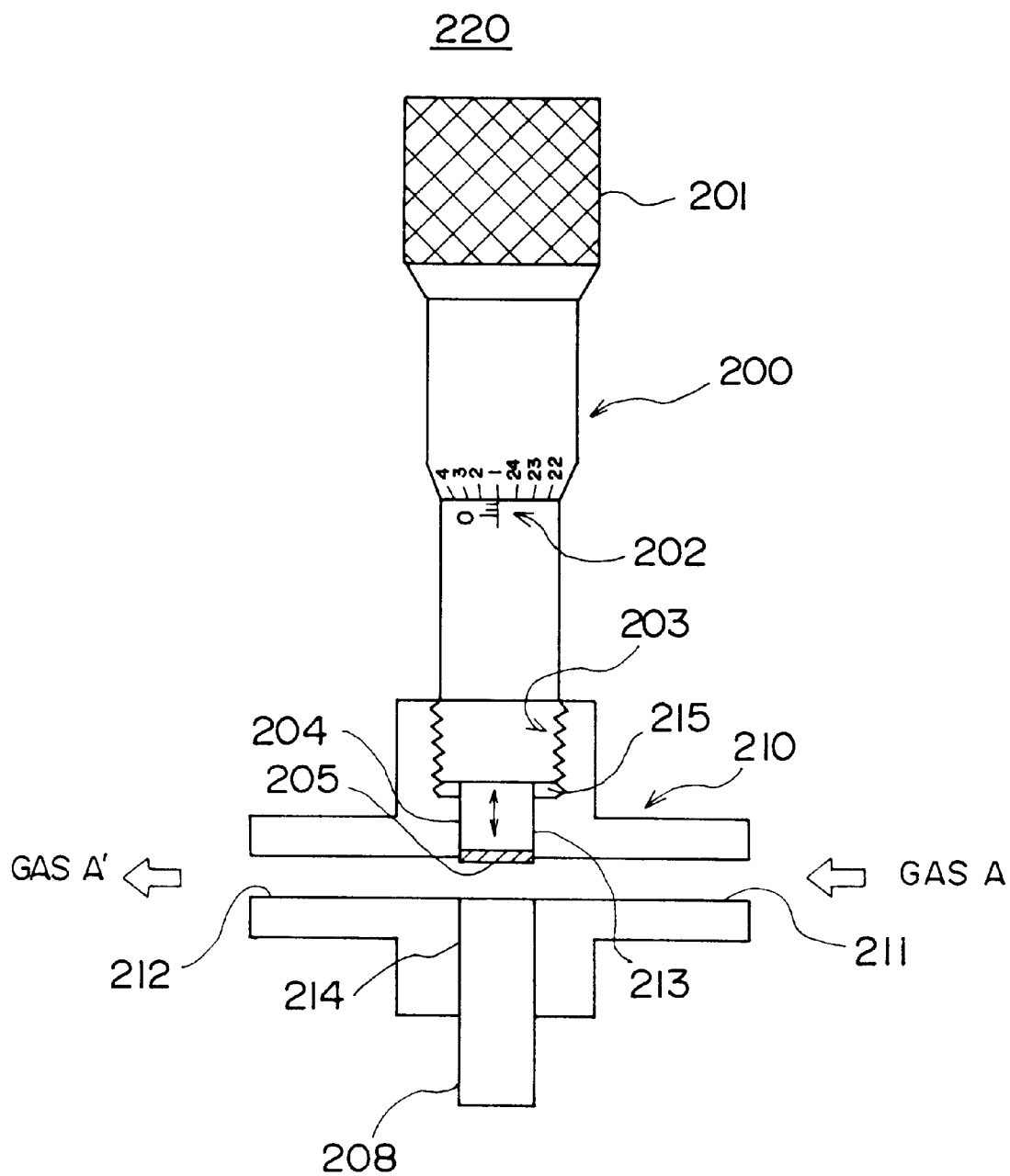
FIG. 10 is an illustrative drawing showing a configuration of a gas reactor according to a third embodiment of the present invention.

FIG. 10 is an illustrative drawing showing a configuration of a gas reactor according to a third embodiment of the present invention.

In FIG. 10, a gas reactor 220 includes a micrometer 200 and a reaction part 210. The micrometer 200 includes a knob 201, a scale 202, a fitting part 203, an upper electrode 204, and a catalyst layer 205. The reaction part 210 includes a gas-injection conduit 211, a gas-emission conduit 212, an upper hole 213, a lower hole 214, a fitting hole 215, and a lower electrode 208.

The upper electrode 204 is movable in a direction shown by an arrow with respect to the micrometer 200. The relative position of the upper electrode 204 in this direction can be adjusted by turning the knob 201 of the micrometer 200. The scale 202 provided for the micrometer 200 gives a reading of a distance between the upper electrode 204 of the micrometer 200 and the lower electrode 208 of the reaction part 210. The knob 201 and the scale 202 provides a means for measuring the gap between the two electrodes.

The fitting part 203 is provided at the lower end of the micrometer 200, and screw threads are cut in the surface of the fitting part 203. The fitting hole 215 of the reaction part 210 is a tapped hole, so that the fitting part 203 of the micrometer 200 can be fit into the fitting hole 215 of the reaction part 210. With the fitting part 203 fit in the fitting hole 215, the upper electrode 204 is positioned inside the upper hole 213 of the reaction part 210. The adjustment of the position of the upper electrode 204 is effected by sliding the upper electrode 204 in the fitting hole 215 of the reaction part 210 by rotation of the knob 201.

The gas-injection conduit 211 and the gas-emission conduit 212 is formed through the reaction part 210. Also, the reaction part 210 has the lower hole 214 to secure the lower electrode 208 inside the lower hole 214. The catalyst layer 205 is coated on the tip of the upper electrode 204. Voltage is applied between the upper electrode 204 and the lower electrode 208 to effect a glow discharge between the electrode.

Gas A is injected from the gas-injection counduit 211, and flows through the gap between the upper electrode 204 and the lower electrode 208. Gas reaction is effected by a synergistic cooperation between the glow discharge and the catalyst action by the catalyst layer 205. A resulting gas A' is emitted from the gas-emission conduit 212.

Since the micrometer 200 is removable from the reaction part 210 by detaching the fitting part 203 of the micrometer 200 from the fitting hole 215 of the reaction part 210, the upper electrode 204 and the catalyst layer 205 can be replaced with another electrode and catalyst layer. Therefore, various advantages such as use of an appropriate catalyst for a given gas reaction, analyzing the used electrode and catalyst layer in analysis of the gas reaction, easy formation of the catalyst layer on the electrode, etc. can be obtained.

In the configuration of the third embodiment, the gap between the upper electrode 204 and the lower hole 214 is accurately adjusted by the scale mechanism of the micrometer 200. Therefore, an appropriate adjustment of the gap between the electrode can be easily carried out. The third embodiment has been described with a particular example of the micrometer. However, it is obvious that any parts or equipment having a similar scale mechanism to that of the micrometer can be used in the third embodiment.

Figure 11:
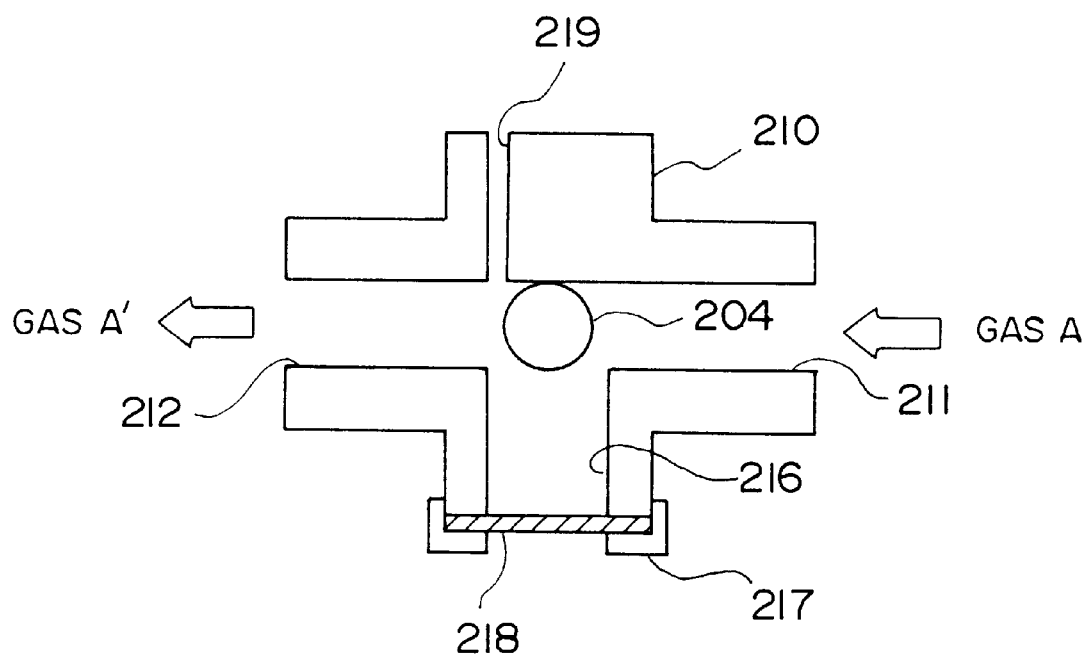
FIG. 11 is an illustrative drawing showing a variation of a reaction part of the gas reactor shown in FIG. 10.

FIG. 11 is an illustrative drawing showing a variation of the reaction part 210 of the third embodiment. FIG. 11 shows a plan view of the reaction part 210 taken along a horizontal plane.

In FIG. 11, the reaction part 210 includes a window 216, a filter cap 217, a filter 218, and a non-excitation-gas-injection conduit 219. The window 216 is arranged to provide a view of a glow-discharge area at the gap. At the end of the window 216, the filter 218 is secured by the filter cap 217 mounted in a fixed manner to the reaction part 210. The filter 218 is the same type as the filter 24 used in the first embodiment. Therefore, near-infrared radiation from the glow discharge can be measured by an external device to conduct a spectrum analysis of the gas reaction.

The non-excitation-gas-injection conduit 219 of the reaction part 210 is used for injecting non-excited gas, which is to be mixed with excited and activated gas. That is, the non-excitation-gas-injection conduit 219 plays the same role as the gas-injection conduit 21 of the first embodiment.

Figure 12:
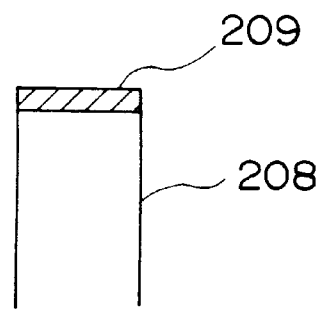
FIG. 12 is an illustrative drawing showing a variation of a lower electrode of the gas reactor shown in FIG. 10.

FIG. 12 is an illustrative drawing showing a variation of the lower electrode 208 of the third embodiment. In this variation, a dielectric layer 209 is coated on the tip of the lower electrode 208. Thus, an appropriate glow discharge can be effected.

Figure 13:
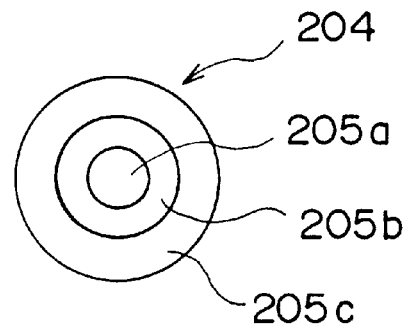
FIG. 13 is an illustrative drawing showing a variation of a catalyst layer provided on a tip of an upper electrode of the gas reactor shown in FIG. 10.

FIG. 13 is an illustrative drawing showing a variation of the catalyst layer 205 provided on the tip of the upper electrode 204. In FIG. 13, three different catalyst layers 205a through 205c are provided in a concentric manner instead of the single catalyst layer 205. An arrangement of the catalyst layers 205a through 205c is not limited to a concentric arrangement, and various arrangements may be used. Also, the number of the catalyst layers is not limited to three, but any appropriate number of the catalyst layers may be used.

In the configuration of FIG. 13, more than one catalyst layer is provided. Therefore, different catalysts can serve for the excitation of different gases in the same manner as in the first and second embodiments. Namely, when the injected gas A is a mixture of different gases, it is advantageous to provide different catalysts suitable for the excitation of these gases. Also, when different catalysts are provided, one catalyst can serve for the excitation of gas and the other catalyst can serve for the activation of the gas.

Figure 14:
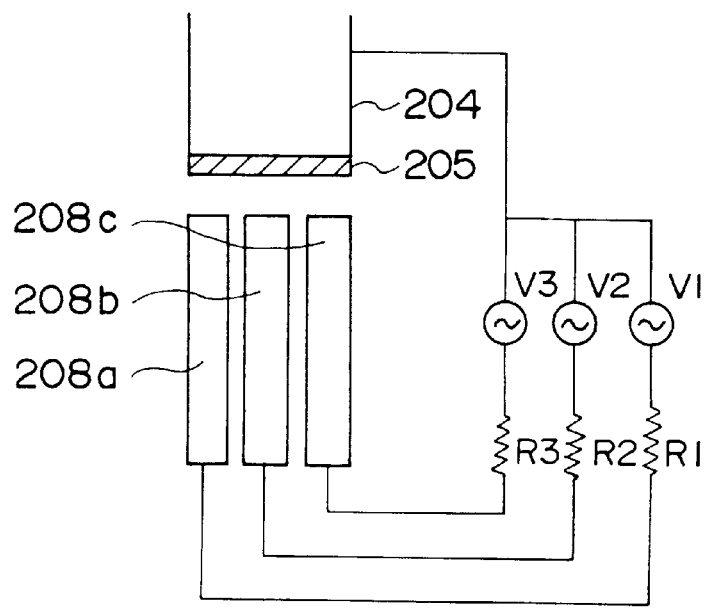
FIG. 14 is an illustrative drawing showing a variation of the lower electrode.

FIG. 14 is an illustrative drawing showing a variation of the lower electrode 208. In FIG. 14, the lower electrode 208 is divided into three lower electrodes 208a, 208b, and 208c, which are connected to power supplies V1 through V3, respectively. Resistances R1 through R3 are serially connected to the power supplies V1 through V3, respectively.

In this configuration, AC power can be independently applied to each of the lower electrodes 208a through 208c. Thus, an AC power level and an AC-power waveform applied to each of the lower electrodes 208a through 208c can be different. This configuration facilitates a more complex gas reaction based on multiple glow discharges independently controlled by independent power supply systems.

Figure 15:
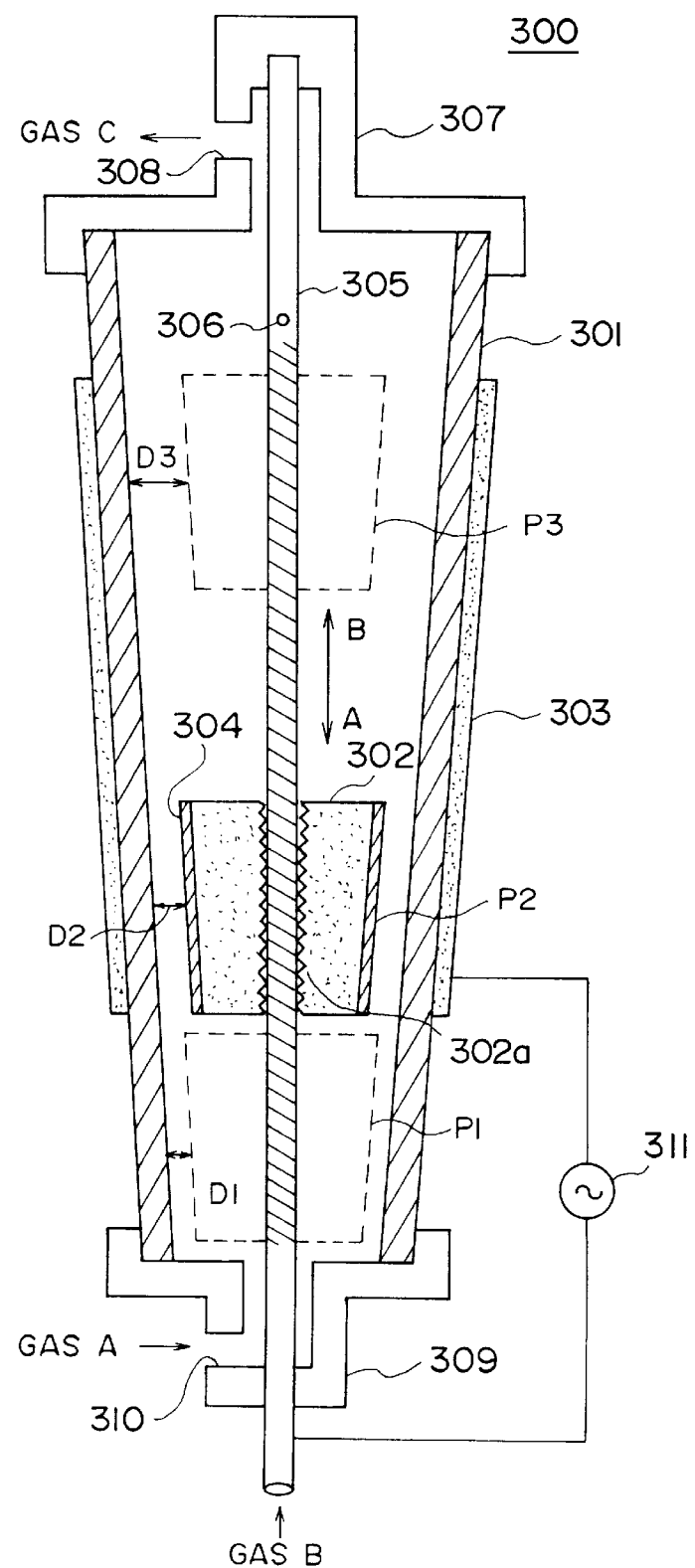
FIG. 15 is an illustrative drawing showing a gas reactor according to a fourth embodiment of the present invention.

FIG. 15 is an illustrative drawing showing a gas reactor according to a fourth embodiment of the present invention.

A gas reactor 300 of FIG. 15 includes a dielectric container 301, a float electrode 302, an outer electrode 303, a catalyst layer 304, a center electrode 305, a gas-ejection hole 306, an upper cap 307, a gas-emission conduit 308, a lower cap 309, a gas-injection conduit 310, and a power supply 311.

The dielectric container 301 is made of a dielectric material such as glass, and has a tube shape with a circular horizontal cross section. On the top of the dielectric container 301, the upper cap 307 is mounted in a fixed manner. The lower cap 309 is mounted in a fixed manner at the bottom of the dielectric container 301. The gas reactor 300 is positioned vertically such that the bottom of the dielectric container 301 is directed toward the ground.

The center electrode 305 is secured between the upper cap 307 and the lower cap 309, and has screw threads cut on the surface thereof. The center electrode 305 is a hollow pipe serving as a conduit for gas B, which is injected from the bottom of the center electrode 305 and ejected from the gas-ejection hole 306.

The float electrode 302 has a tapped hole 302a at a center thereof, and the center electrode 305 extends through the tapped hole 302a. The float electrode 302 moves upward or downward in a direction shown by an arrow A-B along the center electrode 305 by rotating around the center electrode 305. Since the gas reactor 300 is positioned vertically, the float electrode 302 is constantly subjected to gravitational forces applied in direction A.

The lower cap 309 has the gas-injection conduit 310 through which gas A is injected. Gas A flows upward inside the dielectric container 301, and is emitted from the gas-emission conduit 308 provided at the upper cap 307. Since gas A flows in direction B, the float electrode 302 is subjected to an upwardly directed force of the gas flow.

The outer electrode 303 made of a conductive material such as Cu is provided to surround the dielectric container 301. The power supply 311 applies AC power between the outer electrode 303 and the center electrode 305. The float electrode 302 is electrically connected to the center electrode 305, and is made of an electrically conductive material. Also, the float electrode 302 has the catalyst layer 304 formed on the side surface thereof. Thus, when AC power is applied between the center electrode 305 and the outer electrode 303, a glow discharge is generated between the catalyst layer 304 and the outer electrode 303 via the dielectric container 301.

The glow discharge and the catalyst action together effect a gas reaction of the injected gas A. Also, gas B injected into the center electrode 305 is ejected from the gas-ejection hole 306 to be mixed with the excited and activated gas A. As a result of gas reaction of gas A and gas B, gas C is created to be emitted from the gas-emission conduit 308. The gas-ejection hole 306 does not have to be necessarily provided in the gas reactor 300. If the gas-ejection hole 306 is not provided, the gas reactor 300 serves as a gas reactor only for gas A injected through the gas injection conduit 310.

When no gas is injected from the gas-injection conduit 310, no upwardly directed force is applied to the float electrode 302, so that the float electrode 302 is initially positioned at the bottom of the dielectric container 301 as shown by a dotted shape of the float electrode 302 indicated as P1. In this position, no glow discharge is generated because the float electrode 302 is positioned away from the outer electrode 303.

When gas A is injected, an upwardly directed force by the gas flow is applied to the float electrode 302, so that the float electrode 302 floats to a position indicated as P2, for example. In this position, a glow discharge is generated between float electrode 302 and the outer electrode 303 because the float electrode 302 moves to a position surrounded by the outer electrode 303. In this manner, the movement of the float electrode 302 can serve as a switch for switching on the glow discharge.

When a larger quantity of gas A per unit time is injected from the gas-injection conduit 310, a stronger upward force by the gas flow is applied to the float electrode 302. In this case, the float electrode 302 comes to a position indicated as P3, for example. In this manner, a vertical position of the float electrode 302 changes according to the quantity of gas A injected per unit time.

As shown in FIG. 15, a size of the gap between the float electrode 302 (catalyst layer 304) and the dielectric container 301 varies depending on a position of the dielectric container 301. Namely, the gap size is D1 when the float electrode 302 is positioned at position P1, and is D2 when the float electrode 302 is positioned at position P2. Finally, it becomes D3 when the float electrode 302 is positioned at position P3. In this manner, the gap becomes larger toward the top of the dielectric container 301. That is, the gap becomes larger as the gas quantity per unit time is increased.

In this configuration, the AC power applied by the power supply 311 is assumed to be constant. With the constant AC power, the magnitude of the electric field is reciprocal to the gap size, so that this magnitude becomes weaker as the gas quantity per unit time is increased. That is, this configuration allows an adjustment of the magnitude of the electric field despite the constant AC power applied by the power supply 311.

Different magnitudes of the electric field are suitable for different gas reactions. For example, a suitable magnitude of the electric field for the gas reaction of C, CH, $CH_2$, $CH_3$, or $CH_4$ becomes weaker in this order (i.e., the weakest for gas reactions of $CH_4$). Thus, it is advantageous to be able to adjust the magnitude of the electric field to obtain a suitable magnitude for a desired gas reaction by varying the quantity of the gas injected per unit time.

Figure 16:
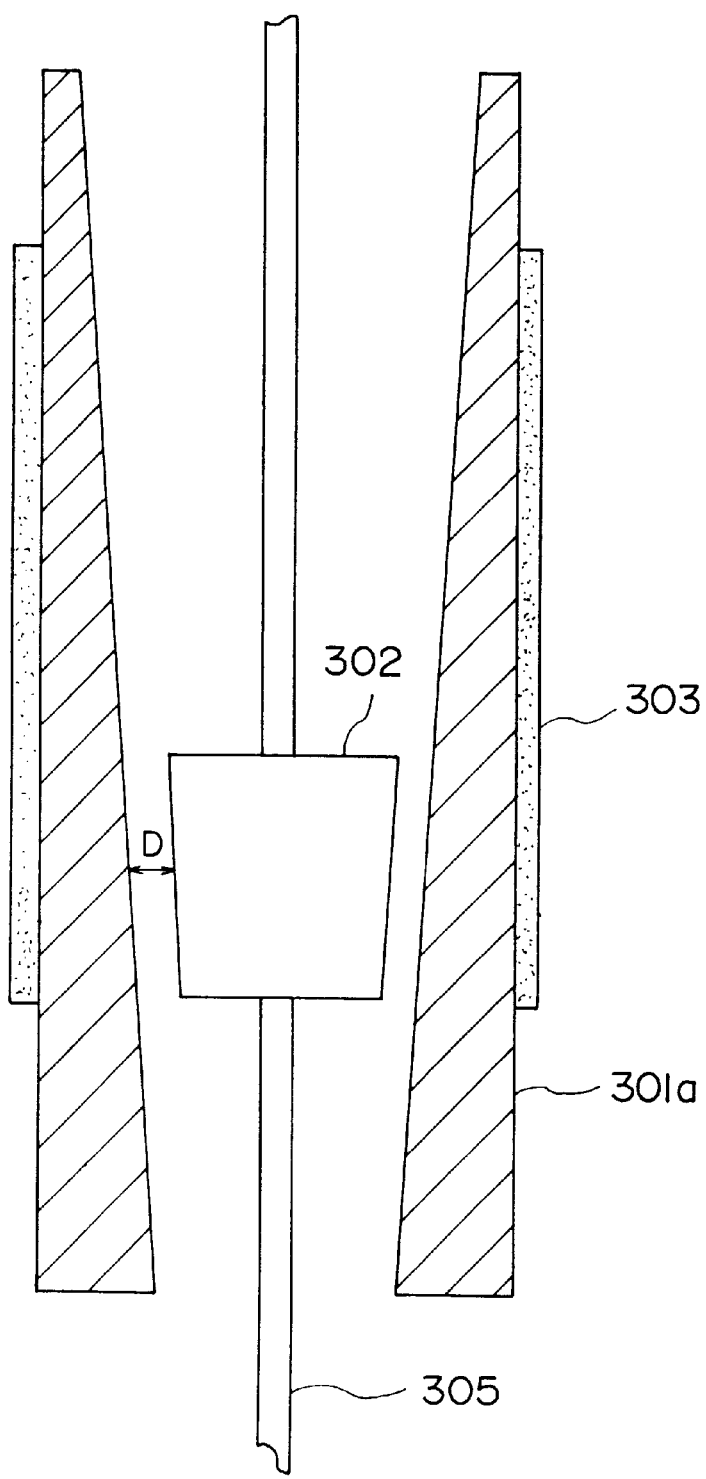
FIG. 16 is an illustrative drawing showing a variation of a dielectric container of the gas reactor shown in FIG. 15.

FIG. 16 is an illustrative drawing showing a variation of the dielectric container 301 of the fourth embodiment. A configuration of FIG. 16 is the same as the configuration of FIG. 15 except for the shape of the dielectric container 301. Thus, only necessary elements for explaining the differences between FIG. 15 and FIG. 16 are shown in FIG. 16, and the other elements that are same as those of FIG. 15 are omitted.

In FIG. 16, a dielectric container 301a replaces the dielectric container 301 of FIG. 15. The dielectric container 301a differs from the dielectric container 301 only in the shape thereof. The dielectric container 301 had a uniform thickness from the top to the bottom thereof. On the other hand, the dielectric container 301a of FIG. 16 has a thickness which is thicker toward the bottom thereof. In this configuration, the magnitude of the electric field at a given vertical position is determined by the thickness of the dielectric container 301a as well as the gap size D between the inner wall of the dielectric container 301a and the float electrode 302. Thus, the electric field can be provided with a desired magnitude distribution in the vertical direction by adjusting the thickness of the dielectric material. Depending on the type of gas reaction, the glow discharge generated by such electric-field distributions may be useful for facilitating the gas reactions.

The float electrode 302 may have a regular cylinder shape with a constant diameter from the bottom to the top. Even in this case, use of the dielectric container 301a may provide uniform distribution of the magnitude of the electric field between the float electrode 302 and the inner wall of the dielectric container 301a if the thickness of the dielectric container 301a is so adjusted. In this manner, there are many variations in the shape of the float electrode 302 and the shape of the dielectric container 301. The particular examples described here are not intended to limit the scope of the present invention in this regard.

Figure 17:
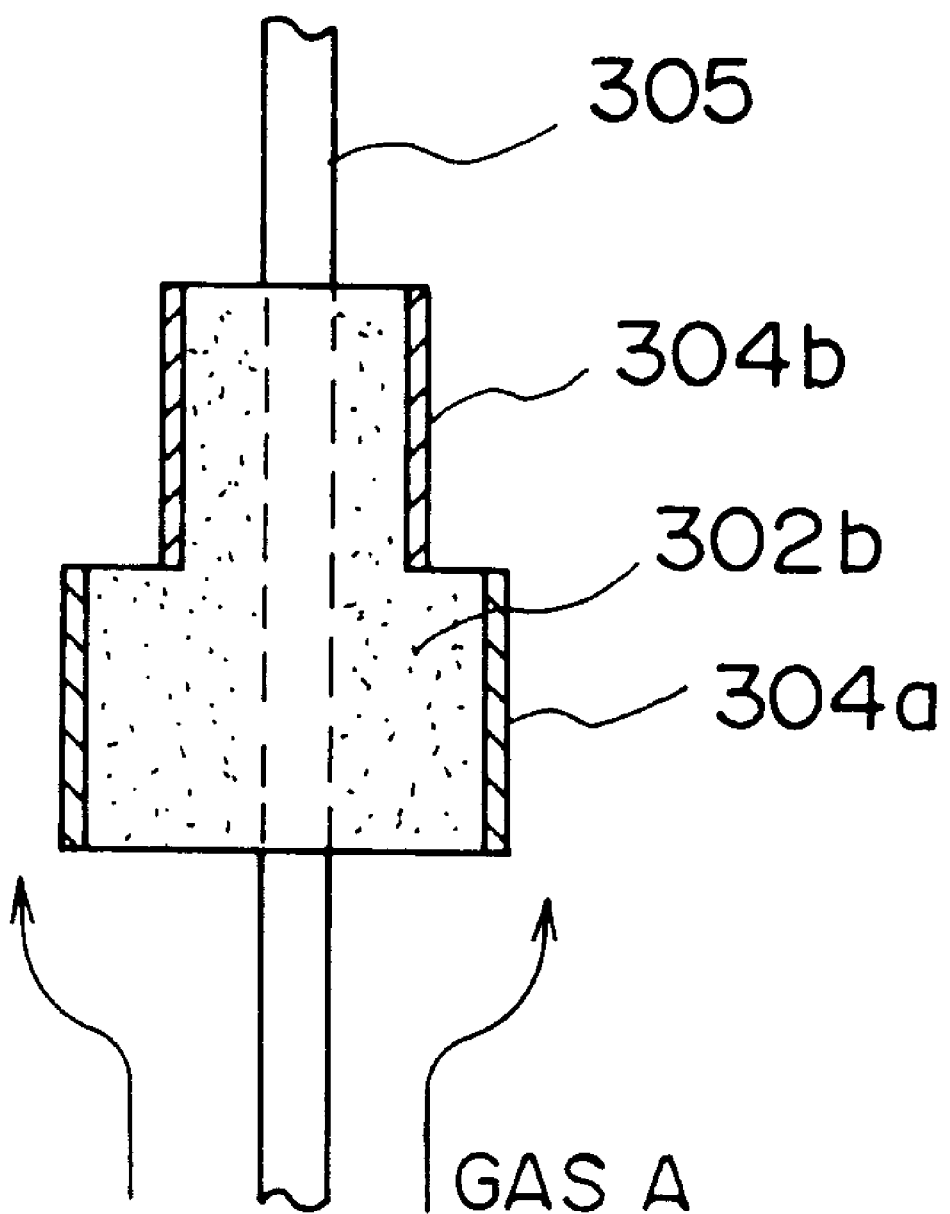
FIG. 17 is an illustrative drawing showing a variation of a floating electrode of the gas reactor shown in FIG. 15.

FIG. 17 is an illustrative drawing showing a variation of the float electrode of the fourth embodiment. A float electrode 302b has a stair-stepped shape as shown in FIG. 17. A catalyst layer 304a and a catalyst layer 304b are each provided for each of the stair steps.

In the configuration of FIG. 17, catalyst layer 304a may be used for the excitation of gas A, and catalyst layer 304b may be used for the activation of excited gas A. Because of the stair-stepped shape of the float electrode 302b, the electric-field magnitude created at the position of the catalyst layer 304a is different from that created at the catalyst layer 304b. Thus, different magnitudes of the electric field respectively suitable for the excitation and the activation of gas A can be used in this configuration. In effect, the absence of glow discharge is desirable for the catalyst layer 304b for the activation of gas A.

The number of catalyst layers is not limited to two as shown in this example, and, also, the shape of the float electrode 302 is not limited to the stair-stepped shape. For example, more than one catalyst layer may be provided on the side surface of the float electrode 302 of FIG. 15 without any change in the shape of the float electrode 302. Alternately, only one catalyst layer may be provided on the side surface of a float electrode having a regular cylindrical shape. Alternately, more than one catalyst layer may be provided on the side surface of such a cylindrical float electrode.

Figure 18:
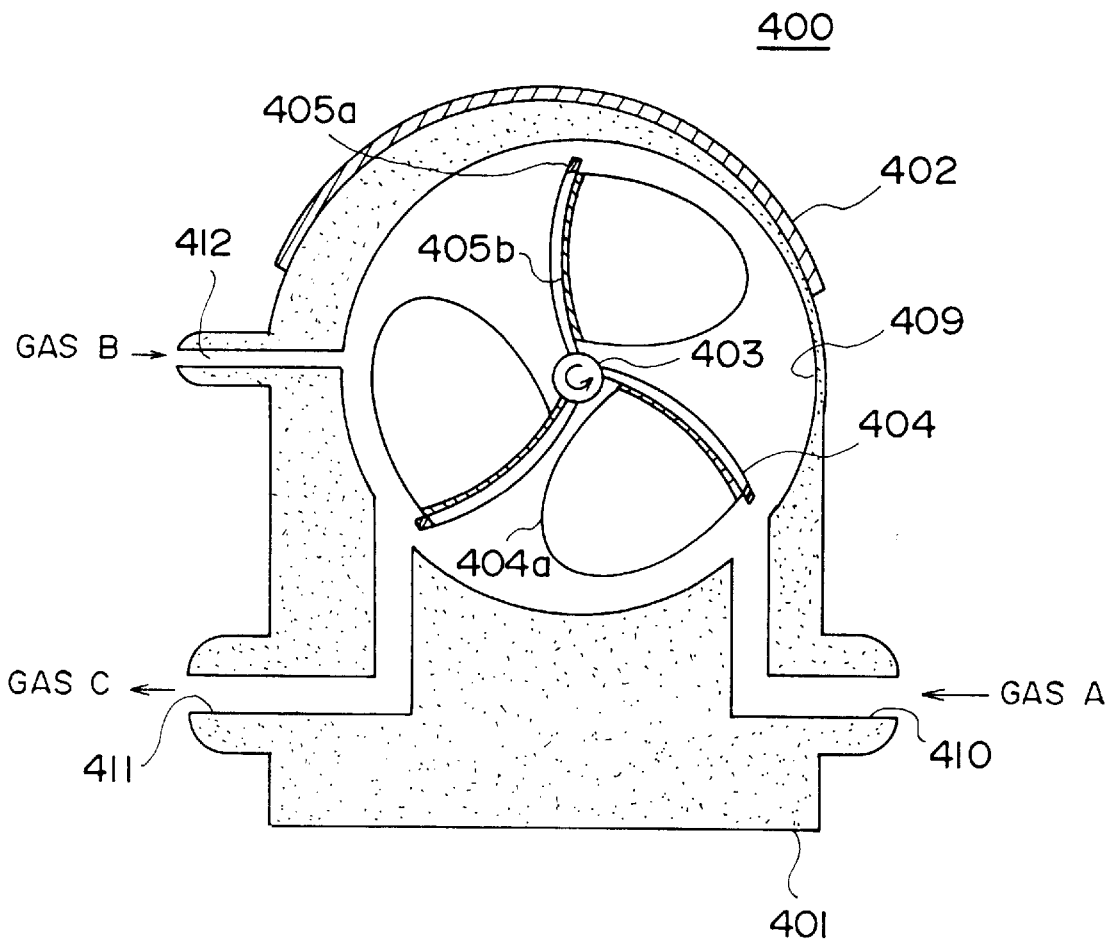
FIG. 18 is an illustrative drawing showing a gas reactor according to a fifth embodiment of the present invention.

FIG. 18 is an illustrative drawing showing a gas reactor according to a fifth embodiment of the present invention. A gas reactor 400 of FIG. 18 includes a casing 401, an outer electrode 402, a rotational shaft 403, blades 404, sub-blades 404a, a catalyst layer 405a, a catalyst layer 405b, a reaction chamber 409, a gas-injection conduit 410, a gas-emission conduit 411, and a non-excitation-gas injection conduit 412.

The casing 401 is made of a dielectric material such as glass, and contains the reaction chamber 409 where gas reaction takes place. The reaction chamber 409 has a substantially round shape. The casing 401 has the gas-injection conduit 410 for leading or directing injected gas A to the reaction chamber 409, and has a gas-emission conduit 411 for leading synthesized gas C from the reaction chamber 409 to the outside of the casing 401. Also, the casing 401 has a non-excitation-gas-injection conduit 412 for leading gas B to the reaction chamber 409.

The outer electrode 402 is attached in a fixed manner to the outside wall of the casing 401 around the reaction chamber 409. In the reaction chamber 409, the rotational shaft 403 made of a conductive material is provided at a general center thereof. To the rotational shaft 403, a plurality of blades 404 made of a conductive material such as Cu are attached. The rotational shaft 403 is rotated in a direction shown by a curved arrow by a driving motor (not shown). AC power is also applied between the rotational shaft 403 and the outer electrode 402 to effect a glow discharge between tip edges of blades 404 and the outer electrode 402 via dielectric material of the casing 401.

Figure 19:
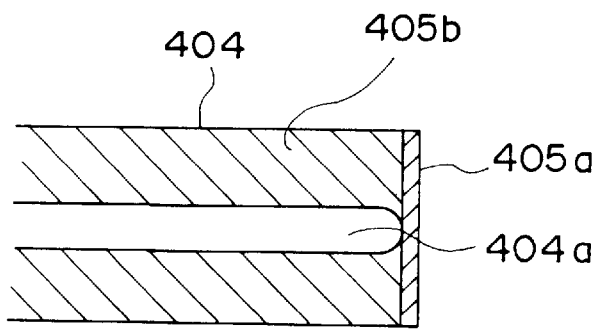
FIG. 19 is an illustrative drawing showing a detailed configuration of blades of FIG. 18.

FIG. 19 is an illustrative drawing showing a detailed configuration of the blades 404. FIG. 19 shows a view of the blades 404 taken from a direction perpendicular to the rotational shaft 403. As shown in FIG. 19, the catalyst layer 405a is provided at the tip edge of the blade 404, and the catalyst layer 405b is provided on a surface of the blade 404 from which the sub-blade 404a extends. The catalyst layer 405a is used for the excitation of the gas A, and the catalyst layer 405b is used for the activation of the excited gas A.

As the blades 404 are rotated inside the reaction chamber 409, the glow discharge generated at gaps between the blades 404 and the inside wall of the reaction chamber 409 brings about gas reaction of gas A synergistically with the catalytic action. Gas A excited by the glow discharge and the catalytic action based on the catalyst layer 405a is activated by catalytic action based on the catalyst layer 405b. Then, the exited and activated gas A is mixed with gas B injected into the reaction chamber 409 via the non-excitation-gas-injection conduit 412. Gas C resulting from the gas reaction of gas A and gas B is then emitted through the gas-emission conduit 411.

In FIG. 18, the thickness of the casing 401 varies around the reaction chamber 409 where the outer electrode 402 is attached. This variation in the thickness of the casing 401 is provided to effect a glow discharge having different magnitudes at different points. Depending on the type of gas reaction, such glow discharge may be useful for facilitating the gas reaction. Alternately, the thickness of the casing 401 may be uniform around the reaction chamber 409 to generate a constant glow discharge.

In this manner, the gas reactor 400 of the fifth embodiment can effectively bring about a gas reaction between an excited and activated gas and a non-excited gas. The configuration of the gas reactor 400 according to the fifth embodiment of the present invention may be such that the blades 404 are removable from the rotational shaft 403 in the same manner as in the second embodiment. In this case, different catalysts can be used for different gas reactions.

Figure 20A:
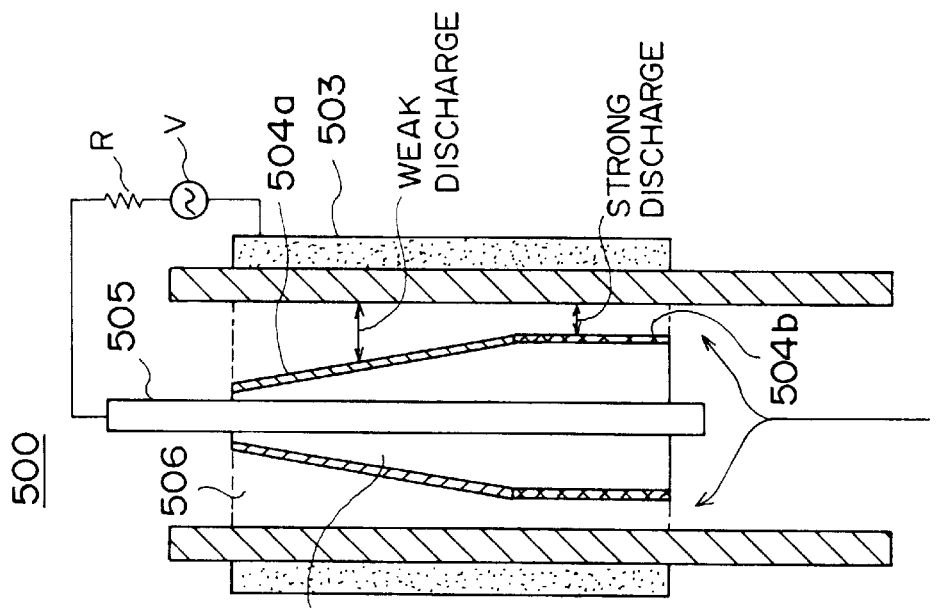
FIGS. 20A through 20C are illustrative drawings showing a gas reactor according to a sixth embodiment of the present invention.
Figure 20B:
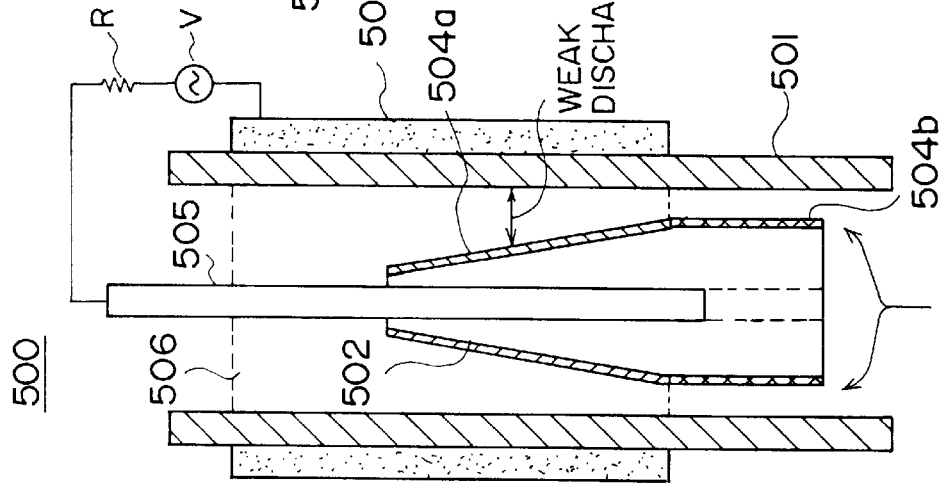
Figure 20C:
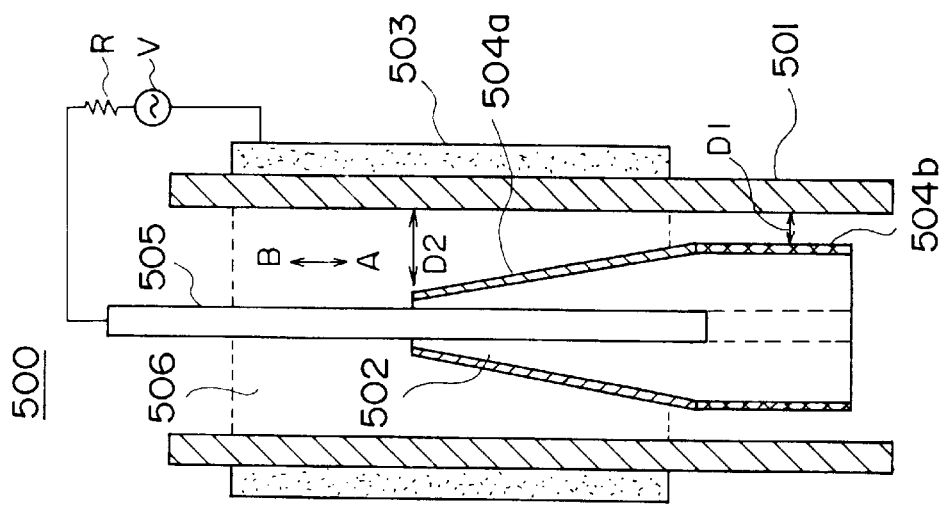

FIGS. 20A through 20C are illustrative drawings showing a gas reactor according to a sixth embodiment of the present invention.

A gas reactor 500 of the sixth embodiment includes a dielectric container 501, a float electrode 502, an outer electrode 503, a catalyst layer 504a, a catalyst layer 504b, a center electrode 505, a resistor R, and a power supply V.

The dielectric container 501 is made of a dielectric material such as glass, and has a tube-like shape forming a conduit for leading or directing gas A. Surrounding the dielectric container 501, the outer electrode 503 is provided on the outer surface of the dielectric container 501. The center electrode 505 is positioned to extend along a general center of the dielectric container 501. The power supply V and the resistor R are serially connected between the outer electrode 503 and the center electrode 505 to apply AC power between these two electrodes.

The float electrode 502 has a hole formed through a general center thereof, and the center electrode 505 is inserted through this hole. The float electrode 502 is movable in a direction shown by an arrow A-B by sliding along the center electrode 505. The gas reactor 500 is vertically positioned such that gravitational force is applied to the float electrode 502 in direction A. The float electrode 502 is positioned at the bottom of the dielectric container 501 when no gas flows through the dielectric container 501. When gas A flows through the dielectric container 501 in direction B, an upwardly directed force by the gas flow is applied to the float electrode 502 to keep the float electrode 502 in a floating position as shown in FIG. 20B or FIG. 20C.

The float electrode 502 has a lower portion keeping a distance D1 from the inner wall of the dielectric container 501, and has an upper portion tapering toward the top thereof. The upper portion of the float electrode 502 keeps a varying distance from the inner wall of the dielectric container 501, and this varying distance increases from D1 at a joint with the lower portion and to D2 at the top of the float electrode 502. The catalyst layer 504a is provided on the surface of the upper portion of the float electrode 502. The catalyst layer 504b is provided on the surface of the lower portion of the float electrode 502. The catalyst layer 504a and the catalyst layer 504b may be formed from different catalysts.

When no gas is injected into the dielectric container 501, the float electrode 502 is positioned at the bottom of the dielectric container 501 as shown in FIG. 20A. In this case, the power supply V is controlled to apply no AC power between the center electrode 505 and the outer electrode 503.

When gas A is injected into the dielectric container 501 from the bottom thereof, the float electrode 502 is floated by the gas flow as shown in FIG. 20B. When gas A is injected, the power supply V applies AC power between the center electrode 505 and the outer electrode 503. Since only the upper portion of the float electrode 502 is positioned within a discharge area 506 surrounded by the outer electrode 503, a glow discharge is generated only between the catalyst layer 504a and the inner wall of the dielectric container 501. In this case, the generated glow discharge is relatively weak because the distance between the catalyst layer 504a and the inner wall of the dielectric container 501 is relatively large.

When a larger amount of gas A per unit time is injected into the dielectric container 501, the float electrode 502 is floated further up by the gas flow as shown in FIG. 20C. Since the lower portion as well as the upper portion of the float electrode 502 are within the discharge area 506, a glow discharge is generated between the catalyst layer 504a and the inner wall of the dielectric container 501 and between the catalyst layer 504b and the inner wall of the dielectric container 501. As previously noted, the distance between a catalyst layer and the inner wall of the dielectric container 501 is larger for the lower portion of the float electrode 502 than for the upper portion of the float electrode 502. Thus, the glow discharge between the catalyst layer 504a and the inner wall of the dielectric container 501 is relatively weak, and the glow discharge between the catalyst layer 504b and the inner wall of the dielectric container 501 is relatively strong.

In the gas reactor 500 as described above, when the amount of gas injection per unit time is smaller than a predetermined amount, a weak glow discharge is generated for the catalyst layer 504a. When the amount of gas injection per unit time is larger than a predetermined amount, a weak glow discharge is generated for the catalyst layer 504a, and a strong glow discharge is generated for the catalyst layer 504b. Therefore, an appropriate gas reaction can take place according to the amount of the gas injection per unit time.

Figure 21:
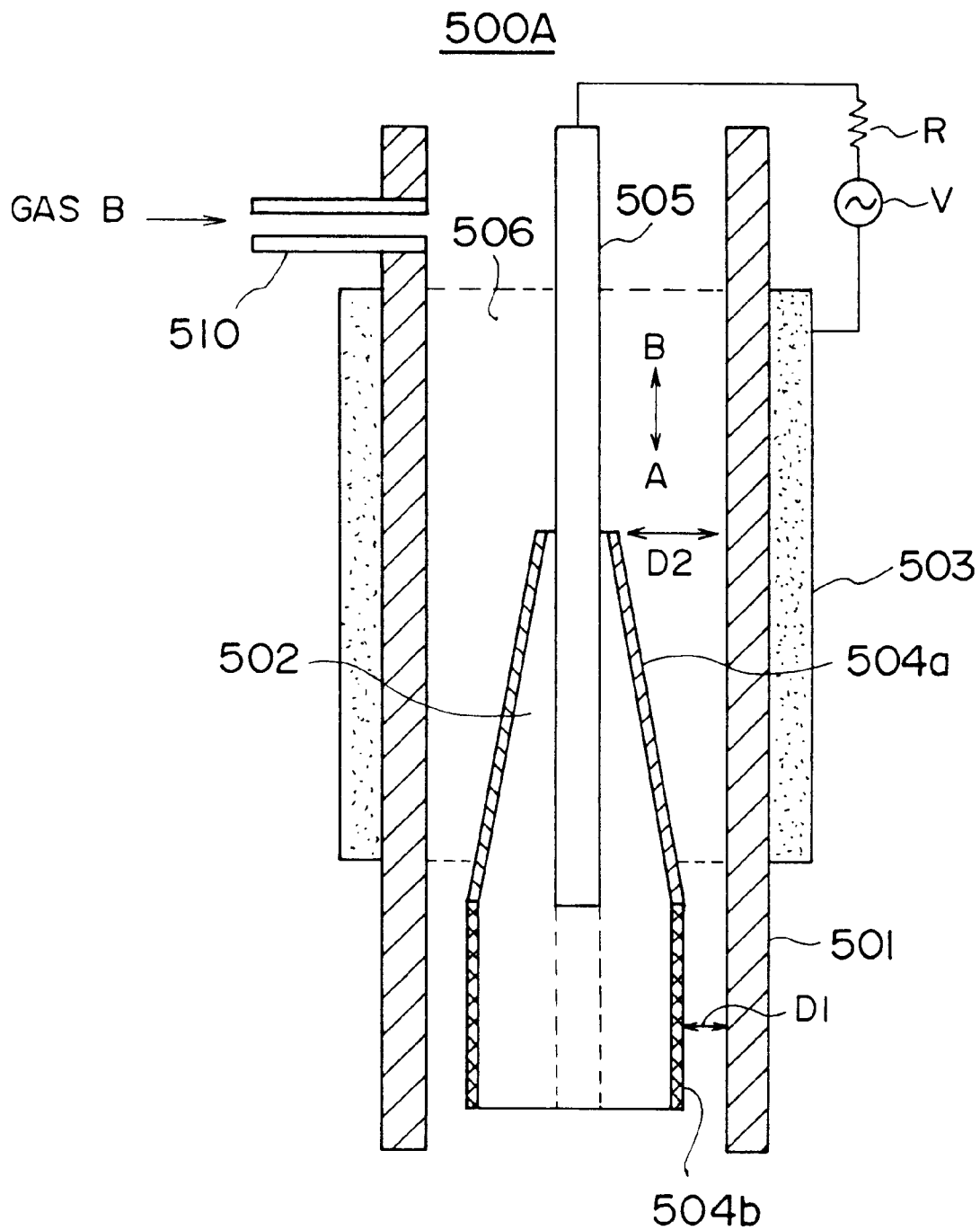
FIG. 21 is an illustrative drawing showing a variation of the gas reactor shown in FIGS. 20A through 20C.

FIG. 21 is an illustrative drawing showing a variation of the gas reactor 500 of FIGS. 20A through 20C. In FIG. 21, the same elements as those of FIGS. 20A through 20C are referred to by the same numerals, and a description thereof will be omitted.

The gas reactor 500A of FIG. 21 includes a non-excitation-gas conduit 510 in addition to all the elements provided in the gas reactor 500. Gas B is injected through the non-excitation-gas conduit 510 into the dielectric container 501 to be mixed with the excited and activated gas A. Mixing of gas B with gas A takes place downstream with regard to the gas flow compared to the discharge area 506. That is, the mixture occurs at a point higher than the top edge of the outer electrode 503. Thus, the glow discharge and the catalytic action do not have any influence on gas B itself, and gas B remains non-excited when mixed with gas A.

In this manner, according to the variation of the sixth embodiment of the present invention, gas reaction can be effected between a non-excited gas and an excited and activated gas in the same manner as in the first embodiment.

Figure 22:
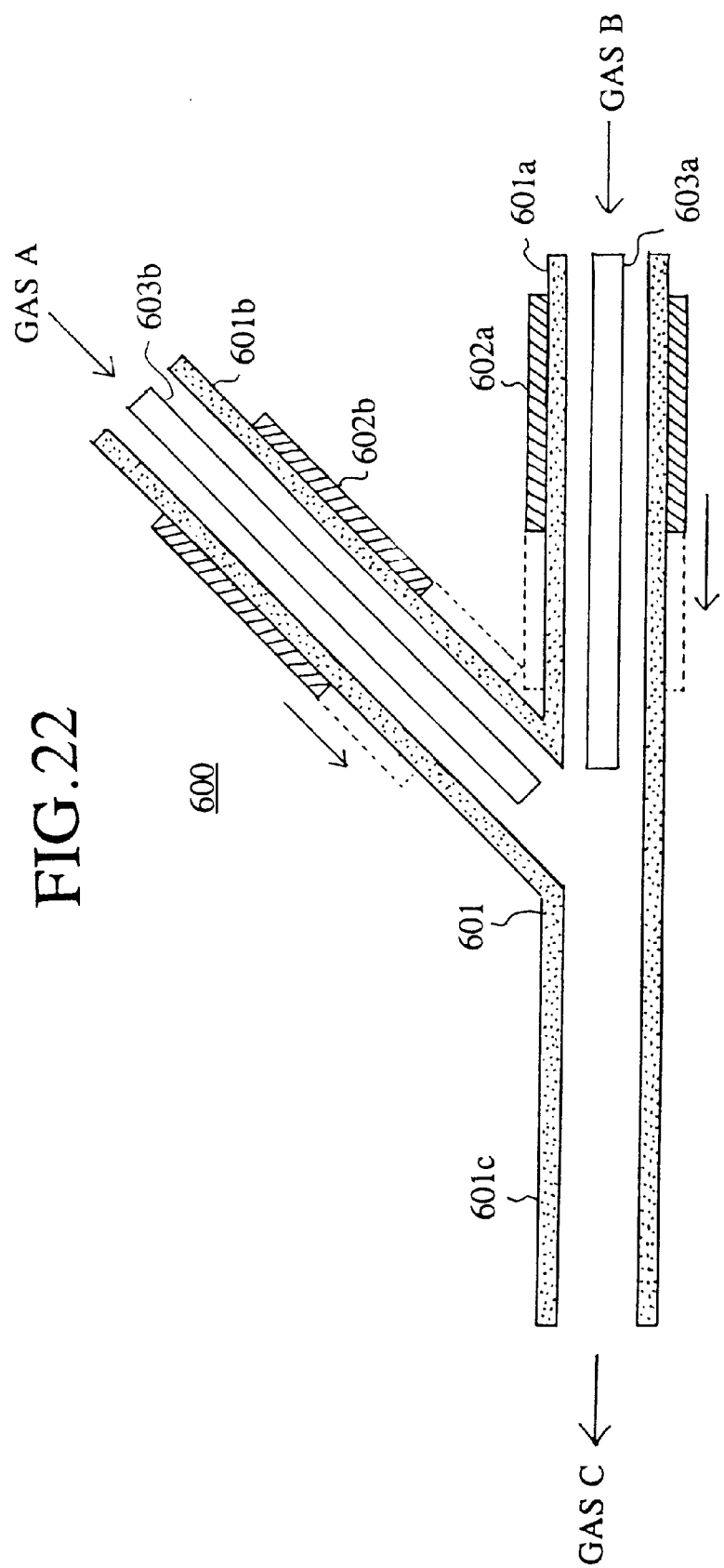
FIGS. 22 is an illustrative drawing showing a gas reactor according to a seventh embodiment of the present invention.

FIGS. 22 is an illustrative drawing showing a gas reactor according to a seventh embodiment of the present invention.

When mixing gas A with gas B to create gas C through chemical reaction, the previous embodiments put only one of the gas A and the gas B into an excited and activated state. It has be found, however, that the excitation and activation of both the gas A and the gas B prove to be beneficial for facilitating chemical reaction. The seventh embodiment of FIG. 22 is aimed at achieving this objective.

A gas reactor 600 of FIG. 22 includes a Y-shaped casing 601, outer electrodes 602a and 602b, and inner electrodes 603a and 603b. The Y-shaped casing 601 is made of a dielectric material such as glass, and may have a circular tube shape to allow gas to flow inside. The Y-shaped casing 601 includes a gas-injection conduit 601a, a gas-injection conduit 601b, and a gas-ejection conduit 601c, which are connected with each other at one end to form a Y shape.

The outer electrode 602a is provided to surround the gas-injection conduit 601a, and the outer electrode 602b envelops the gas-injection conduit 601b. The outer electrodes 602a and 602b are made of copper or the like.

The inner electrodes 603a and 603b are placed inside the gas-injection conduits 601a and 601b, respectively, at a general center of the circular cross section. The inner electrodes 603a and 603b may be made of copper or the like with a coated catalyst layer, or may be made of a catalyst.

AC power is applied between the outer electrode 602a and the inner electrode 603a as well as between the outer electrode 602b and the inner electrode 603b so as to generate glow discharge inside the Y-shaped casing 601. The glow discharge excites the gas A and the gas B, and the catalyst helps to activate the excited gas A and gas B. The excited and activated gas A and gas B are mixed to effect chemical reaction, thereby producing gas C which is ejected from the gas-ejection conduit 601c.

The outer electrodes 602a and 602b are movable along the extension of the gas-injection conduits 601a and 601b, respectively. When the outer electrodes 602a and 602b are positioned nearest to the intersection between the gas-injection conduits 601a and 601b as shown by dotted lines in FIG. 22, the gas A and the gas B can be mixed while plasma action created by the glow discharge is taking place. That is, the plasma action is present where the excited and activated gas A meets with the excited and activated gas B. This condition may further facilitate the chemical reaction. Hereinafter, this condition is referred to as "coupling".

In the configuration of FIG. 22, whether to establish the coupling condition is dependent on the position of the outer electrodes 602a and 602b along the extension of the gas-injection conduits 601a and 601b, respectively. Alternately, the outer electrodes 602a and 602b may be provided to cover the full extent of the gas-injection conduits 601a and 601b, respectively, and the inner electrodes 603a and 603b may be inserted more or inserted less into the gas injection conduits 601a and 601b, respectively, to adjust the extent of the area where glow discharge is generated.

Figure 23:
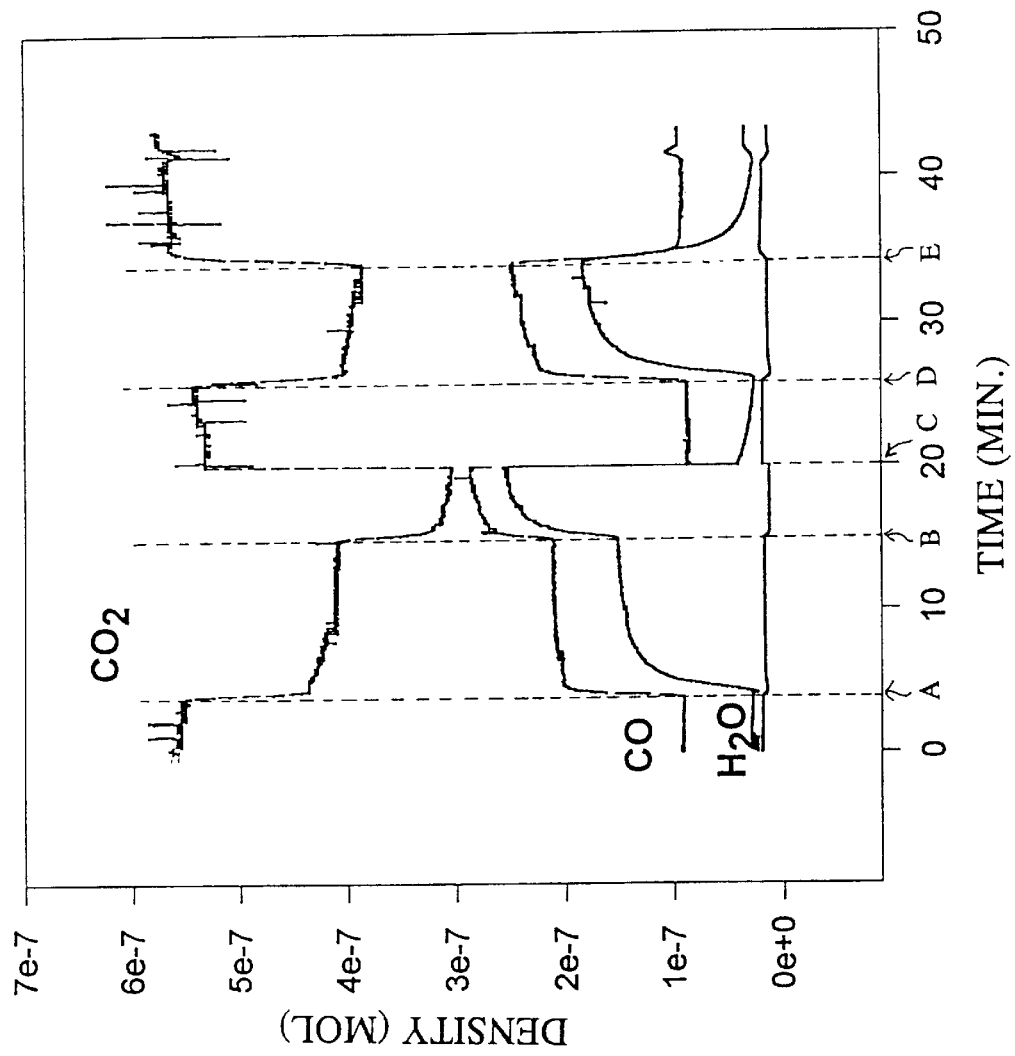
FIG. 23 is a chart which demonstrates a favorable effect of coupling with regard to a particular chemical reaction.

FIG. 23 is a chart which demonstrates a favorable effect of coupling with regard to a particular chemical reaction.

FIG. 23 shows a chemical reaction between $CO_2$ and $H_2$ effected by the gas reactor 600 of FIG. 22 when $CO_2$ and $H_2$ are injected to the gas-injection conduits 601a and 602a, respectively. For the demonstration of FIG. 23, iron is used as a material for the inner electrodes 603a and 603b. AC power applied between the outer electrode 602a and the inner electrode 603a as well as the outer electrode 602b and the inner electrode 603b has a voltage of 9.3 kV and a frequency of 8.2 kHz. Further, the Y-shaped casing 601 has a diameter of 10 mm at portions having a straight-tube shape.

In FIG. 23, the abscissa shows passage of time, and the ordinate shows density of each gas component measured in mols. At a time A, glow discharge is started only with respect to $CO_2$. Because of chemical reaction between $CO_2$ and $H_2$, the density of $CO_2$ decreases as shown in the figure, and, at the same time, CO and $H_2O$, obtained as products of the reaction, increase in density. After some time passes, the densities of $CO_2$, CO, and $H_2O$ stabilizes at constant levels.

At a time B, glow discharge is also started with respect to $H_2$, and the coupling condition is installed. As can be seen in the figure, coupling in addition to the plasma action of both $CO_2$ and $H_2$ achieves a higher rate of chemical reaction. At a time C, the glow discharge is stopped, and the outer electrodes 602a and 602b are brought back to their original position. Density of each gas returns to its original level. At a time D, glow discharge is generated with respect to both $CO_2$ and $H_2$, but coupling is not put in place. Density of $CO_2$ decreases while densities of CO and $H_2O$ increase. The decrease in $CO_2$ and the increases in CO and $H_2O$ are larger than when only $CO_2$ is subjected to plasma action, but fails to reach levels which are attained by the coupling.

As can be seen in FIG. 23, this particular chemical reaction is best facilitated when both $CO_2$ and $H_2$ are subjected to plasma action under the coupling condition.

Table 1 provided below shows another chemical reaction, i.e., a chemical reaction between $H_2$ and CO.

TABLE 1

| CONDITION | V(kV) | I(mA) | CO(%) | $H_2O$(%) | $CO_2$(%) | $CH_4$(%) |
|---|---|---|---|---|---|---|
| $H_2$* + CO | 1.96 | 12.1 | 5.6 | 9.1 | 40.9 | 50.0 |
| $H_2$ + CO* | 1.96 | 14.7 | 16.5 | 0.0 | 50.4 | 49.6 |
| $H_2$* + CO* | 1.96 | 24.5 | 16.6 | 7.2 | 43.0 | 49.8 |
| $H_2$*/CO* | 1.96 | 24.1 | 18.8 | 26.6 | 23.4 | 50.0 |

When $H_2$ and CO are used, two competing reactions as follows are observed.

$$CO + H_2 = CH_4 + H_2O \quad (1)$$

$$2CO + 2H_2 = CO_2 + CH_4 \quad (2)$$

In Table 1, the column labeled as CO(%) represents a conversion rate at which injected CO is converted to something else. That is, the conversion rate is the same as the decreased amount of CO represented as a percentage to the total injected amount of CO. Columns labeled as $H_2O$(%), $CO_2$(%), and $CH_4$(%) represent selectivities of $H_2O$, $CO_2$, and $CH_4$, respectively. Selectivity of $H_2O$, for example, represents a percentage which $H_2O$ accounts for in the total amount of output products. Further, asterisk "*" means that a gas marked by this symbol is subjected to plasma action. The symbol "+" represents simple mixing of $H_2$ and CO, whereas the symbol "/" represents coupling of $H_2$ and CO.

As can be seen in Table 1, coupling achieves the highest conversion rate of CO and the highest selectivity of $H_2O$. That is, when coupling is employed, CO is converted to other products at a rate higher than other cases, and the reaction (1) producing $H_2O$ is favored over the reaction (2) which generates $CO_2$. On the other hand, a non-coupling mixture of plasma CO and plasma $H_2$ favors the reaction (2) over the reaction (1), thereby producing more $CO_2$ and less $H_2O$ than the case of coupling.

As described above, the gas reactor of the seventh embodiment allows both the gas A and the gas B to be subjected to plasma action effected by glow discharge, and mixes the gas A and the gas B to produce gas C. If preferred, the gas reactor of the seventh embodiment can mix the gas A and the gas B while they are involved in the plasma action. It is apparent that the gas reactor of the seventh embodiment can generate glow discharge with respect to only one of the gas A and the gas B. A decision as to which one of the above conditions is to be used may be made in view of an intended chemical reaction.

FIG. 24 is an illustrative drawing showing a variation of the seventh embodiment of the present invention.

A gas reactor 610 of FIG. 24 incldes a T-shaped casing 611, an outer electrode 612, and an inner electrode 613. The T-shaped casing 611 is made of a dielectric material such as glass, and may have a circular tube shape to allow gas to flow inside. The T-shaped casing 611 includes a gas-injection conduit 611a, a gas-injection conduit 611b, and a gas-ejection conduit 611c, which are connected with each other at one end to form a T shape.

The outer electrode 612 is provided to surround the T-shaped casing 611 around an intersection where the gas-injection conduit 611a, the gas-injection conduit 611b, and the gas-ejection conduit 611c meet. The outer electrode 612 is made of copper or the like.

The inner electrode 613 is placed inside the T-shaped casing 611 at a general center of the circular cross-section. The inner electrode 613 may be made of copper or the like with a coated catalyst layer, or may be made of a catalyst.

AC power is applied between the outer electrode 612 and the inner electrode 613 so as to generate glow discharge inside the T-shaped casing 611. The glow discharge excites the gas A and the gas B, and the catalyst helps to activate the excited gas A and gas B. The excited and activated gas A and gas B are mixed to effect chemical reaction, thereby producing gas C which is ejected from the gas-ejection conduit 611c.

As can be seen from the configuration of FIG. 24, plasma action is present where the excited and activated gas A meets with the excited and activated gas B. This condition which is referred to as "coupling" as in the previous embodiment further facilitates an intended chemical reaction.

As described above, the gas reactor of a variation of the seventh embodiment allows both the gas A and the gas B to be subjected to plasma action effected by glow discharge, and mixes the gas A and the gas B while they are involved in the plasma action. Because of the plasma action and coupling of both of the gases A and B, a higher conversion rate and a higher selectivity can be achieved with respect to an intended chemical reaction.

FIG. 25 is an illustrative drawing showing a gas reactor according to an eighth embodiment of the present invention.

A gas reactor 700 of FIG. 25 incldes a casing 701, an outer electrode 702, and an inner electrode 703. The casing 701 is made of a dielectric material such as glass, and has a circular tube shape. The outer electrode 702 is attached to and wrapped around the casing 701. The outer electrode 702 is made of copper or the like. The inner electrode 703 may be made of copper or the like with a catalyst layer coated thereon, or may be made of a catalyst.

The inner electrode 703 has a hollow structure such as that of a circular tube, and one or more holes such as holes 703a through 703c are provided to connect between the inside and outside of the inner electrode 703.

Gas A is injected into the casing 701, and gas B is injected into the inner electrode 703. The gas B comes out of the inner electrode 703 through the holes 703a through 703c.

Some of the holes 703a through 703c may be provided within the discharge area where glow discharge is effected between the outer electrode 702 and the inner electrode 703. Because of this, both of the gases A and B are subjected to the glow discharge, and are activated by catalyst action with the catalyst. The excited and activated gases A and B are mixed in the discharge area where plasma action is taking place, so that the condition of coupling as previously described is established in the configuration of FIG. 25.

The number and positions of the holes 703a through 703c may be decided in advance with regard to a particular chemical reaction. Such a decision may be made based on conversion rates and selectivities measured in a test which is conducted under various conditions with regard to numbers and positions of the holes. Depending on circumstances, there may be a case in which only one hole is provided outside the discharge area at such a position as that of the hole 703c.

The configuration of the eighth embodiment relates to the gas reactor 300 of the fourth embodiment shown in FIG. 15. In FIG. 15, the gas-ejection hole 306 is provided outside the discharge area downstream with regard to the flow of the gas A. Thus, in FIG. 15, the gas B ejected through the gas-ejection hole 306 is neither excited nor activated when mixed with the excited and activated gas A.

The configuration of the gas reactor 300 shown in FIG. 15 may be changed such that the gas-ejection hole 306 is provided in the discharge area. Further, one or more holes similar to the gas-ejection hole 306 may be provided in addition to the gas-ejection hole 306. In such a new configuration, the gas reactor 300 can establish the coupling of the gas A and the gas B to achieve a higher conversion rate and a selectivity for an intended chemical reaction.

Further, the present invention is not limited to these embodiments, but variations and modifications may be made without departing from the scope of the present invention.

What is claimed is:

1. A gas reactor comprising:

a dielectric casing made of a dielectric material and having a first conduit formed therein for directing first gas in one direction;

a first electrode positioned inside said dielectric casing along a general center thereof and extending in said direction;

at least one catalyst layer formed on a surface of said first electrode;

a second electrode surrounding an outer wall of said dielectric casing; and a power-supply unit applying AC power between said first electrode and said second electrode to generate a glow discharge inside said dielectric casing.

2. The gas reactor of claim 1, wherein said second electrode defines a discharge area having a starting point and an ending point in said direction to generate said glow discharge only within said discharge area, and wherein said at least one catalyst layer comprises:

at least one excitation catalyst layer formed on said surface of said first electrode substantially within said discharge area; and at least one activation catalyst layer formed on said surface of said first electrode substantially outside said discharge area, said at least one excitation catalyst layer provided for excitation of said first gas and said at least one activation catalyst layer provided for activation of said first gas.

3. The gas reactor of claim 1, further comprising a second conduit for directing a second gas there through, said second conduit having one end connected to one end of said dielectric conduit, wherein said first gas having passed through said dielectric casing is mixed with said second gas having passed through said second conduit.

4. The gas reactor of claim 2, further comprising a second conduit for directing a second gas there through, said second conduit having one end connected to one end of said dielectric conduit, wherein said first gas having passed through said dielectric casing is mixed with said second gas having passed through said second conduit.

5. The gas reactor of claim 4, further comprising a filter through which near-infrared radiation generated by said glow discharge can be observed by an external measurement device.

6. The gas reactor of claim 4, wherein said second electrode is movable in said direction, so that a position of said discharge area is adjustable in said direction.

7. The gas reactor of claim 1, further comprising a plurality of spacers inserted between said dielectric casing and said first electrode.

8. A gas reactor system comprising:

a plurality of gas reactors connected in series; and a power-supply unit supplying AC power to said plurality of gas reactors, wherein each of said plurality of gas reactors comprising:

a dielectric casing made of a dielectric material and having a conduit formed therein for directing gas in one direction;

a first electrode positioned inside said dielectric casing along a general center thereof and extending in said direction;

at least one catalyst layer formed on a surface of said first electrode; and a second electrode surrounding an outer wall of said dielectric casing, wherein said AC power is applied between said first electrode and said second electrode to generate a glow discharge inside said dielectric casing.

9. The gas reactor system of claim 8, wherein said power-supply unit supplies said AC power independently to each of said plurality of gas reactors, so that said AC power can be different for each of said plurality of gas reactors.

10. A gas reactor system comprising:

a plurality of gas reactors connected in parallel; and a power-supply unit supplying AC power to said plurality of gas reactors, wherein each of said plurality of gas reactors comprising:

a dielectric casing made of a dielectric material and having a conduit formed therein for directing gas in one direction;

a first electrode positioned inside said dielectric casing along a general center thereof and extending in said direction;

at least one catalyst layer formed on a surface of said first electrode; and a second electrode surrounding an outer wall of said dielectric casing, wherein said AC power is applied between said first electrode and said second electrode to generate a glow discharge inside said dielectric casing.

11. The gas reactor system of claim 10, wherein said power-supply unit supplies said AC power independently to each of said plurality of gas reactors so that said AC power can be different for each of said plurality of gas reactors.

12. A gas reactor comprising:

a casing having a first opening and a second opening;

a rotor provided inside said casing;

a shaft attached to a center of said rotor;

a motor provided outside said casing to rotate said rotor inside said casing via said shaft;

removable blades provided on a perimeter of said rotor, said removable blades being removable from said rotor;

a catalyst layer of at least one type of catalyst provided on a tip of each of said removable blades;

an electrode provided on an inner wall of said casing to surround said perimeter of said rotor;

a power-supply unit generating a glow discharge between said tip of said removable blades and said electrode, wherein gas injected from said first opening is directed to said glow discharge by rotation of said removable blades before being ejected from said second opening.

13. The gas reactor of claim 12, wherein said catalyst layer of at least one type comprises a catalyst layer of a first type and a catalyst layer of a second type, each of said first type and said second type being provided on said tip of every other one of said removable blades.

14. The gas reactor of claim 13, further comprising perimeter catalyst layers of at least one type provided on said perimeter of said rotor.

15. A gas reactor comprising:

a casing having a conduit for directing first gas in a first direction;

a first electrode penetrating through said casing in a second direction generally perpendicular to said first direction to expose a tip surface thereof to said first gas;

a second electrode having a tip surface thereof facing said tip surface of said first electrode;

at least one catalyst layer provided on at least one of said tip surface of said first electrode and said tip surface of said second electrode;

a power-supply unit generating a glow discharge between said first electrode and said second electrode;

an adjusting mechanism adjusting a gap between said tip surface of said first electrode and said tip surface of said second electrode by moving said first electrode in said second direction; and a scale mechanism providing information as to a size of said gap.

16. The gas reactor of claim 15, further comprising a filter attached to said casing, wherein said casing has a window provided therein so that near-infrared radiation generated by said glow discharge can be observed through said window and said filter.

17. The gas reactor of claim 16, wherein said casing has a gas-injection hole for injecting a second gas into said conduit at a point downstream from said glow discharge with respect to a flow of said first gas.

18. The gas reactor of claim 15, wherein said second electrode comprises a plurality of electrodes having a tip surface thereof facing said tip surface of said first electrode, and said power-supply unit generates an independent glow discharge for each of said plurality of electrodes.

19. A gas reactor comprising;
a dielectric casing made of a dielectric material and having a first conduit formed therein for directing first gas, said dielectric casing positioned vertically and having an inner diameter increasing from a bottom end thereof to a top end thereof, said first gas injected from said bottom end;
a center electrode positioned vertically inside said dielectric casing along a general vertical center thereof;
a float electrode having a hole at a general center thereof for placing said center electrode there through so as to be movable along said center electrode, said float electrode having a vertical position along said center electrode determined by a flow amount of said first gas;
at least one catalyst layer formed on a surface of said float electrode facing an inner surface of said dielectric casing;
an outer electrode surrounding an outer wall of said dielectric casing; and
a power-supply unit applying AC power between said center electrode and said outer electrode to generate a glow discharge between said float electrode and an inner wall of said dielectric casing.

20. The gas reactor of claim 19, wherein said outer electrode defines a discharge area having a bottom end and a top end in a vertical direction to generate said glow discharge only within said discharge area so that said glow discharge takes place only when said float electrode is moved upwardly by said first gas to be positioned substantially within said discharge area.

21. The gas reactor of claim 19, wherein said center electrode has a pipe shape for directing a second gas through an inner space thereof, and has at least one hole for ejecting said second gas into said dielectric casing.

22. The gas reactor of claim 19, wherein said dielectric casing has a thickness which is greater at the bottom end thereof than the top end thereof.

23. The gas reactor of claim 19, wherein said float electrode has a first portion having a first surface and a second portion having a second surface, said first surface and said second surface facing said inner surface of said dielectric casing, said first surface being closer than said second surface to said inner surface of said dielectric casing, said at least one catalyst layer comprising a first catalyst layer formed on said first surface and a second catalyst layer formed on said second surface.

24. The gas reactor of claim 23, wherein said first catalyst layer provides for excitation of said first gas, and said second catalyst layer provides for activation of said first gas.

25. A gas reactor comprising:
a dielectric casing made of a dielectric material and having a round chamber;
a first conduit directing a first gas into said round chamber;
a second conduit directing said first gas out of said round chamber;
a rotational shaft provided at a general center of said round chamber;
blades attached to said rotational shaft;
a first catalyst layer provided at a tip of each of said blades;
a second catalyst layer provided on a surface of each of said blades an electrode provided on an outer surface of said dielectric casing to surround part of said round chamber
a motor rotating said rotational shaft so that said blades rotate with said rotational shaft;
a power-supply unit applying AC power between said blades and said electrode to generate a glow discharge between an inner wall of said round chamber and said tip of each of said blades; and
a third conduit for directing second gas into said round chamber at a point after said first gas is exposed to said glow discharge and before said first gas is directed into said second conduit.

26. A gas reactor comprising:
a dielectric casing made of a dielectric material and having a first conduit formed therein for directing first gas, said dielectric casing positioned vertically and said first gas injected from a bottom end thereof;
a center electrode positioned vertically inside said dielectric casing along a general center thereof;
a float electrode having a hole at a general center thereof for placing said center electrode there through so as to be movable along said center electrode, said float electrode having a vertical position along said center electrode determined by an amount of flow of said first gas, said float electrode having from a bottom thereof to a top thereof a first surface and a second surface facing an inner wall of said dielectric casing, said first surface keeping a constant distance from said inner wall of said dielectric casing and said second surface having a varying distance from said inner wall of said dielectric casing, said varying distance increasing from said constant distance toward said top of said float electrode;
a first catalyst layer formed on said first surface of said float electrode;
a second catalyst layer formed on said second surface of said float electrode;
an outer electrode surrounding an outer wall of said dielectric casing; and
a power-supply unit applying AC power between said center electrode and said outer electrode to generate a glow discharge between said float electrode and an inner wall of said dielectric casing.

27. The gas reactor of claim 26, wherein said outer electrode defines a discharge area having a bottom end and a top end in a vertical direction to generate said glow discharge only within said discharge area so that said glow discharge takes place at a first magnitude when only said second surface of said float electrode is within said discharge area, and takes place partly at a second magnitude which is greater than said first magnitude when said second surface and said first surface of said float electrode are within said discharge area.

28. The gas reactor af claim 27, further comprising a second conduit for directing a second gas to mix said second gas with said first gas at a point downstream from said discharge area with respect to a flow of said first gas.

29. A gas reactor comprising:
a dielectric casing made of a dielectric material and having a first conduit therein for directing first gas, a second conduit therein for directing second gas, and an intersection portion where said first gas and said second gas meet;

at least one inner electrode provided inside said dielectric casing and including at least one catalyst;

at least one outer electrode surrounding an outer wall of said dielectric casing; and a power-supply unit applying AC power between said at least one inner electrode and said at least one outer electrode to generate glow discharge inside said dielectric casing so that plasma action is substantially present inside at least one of said first conduit, said second conduit, and said intersection portion.

30. The gas reactor of claim 29, wherein said at least one outer electrode is movable along an extension of said first conduit and along an extension of said second conduit so as to control a position of said glow discharge.

31. The gas reactor of claim 29, wherein said at least one inner electrode is movable along an extension of said first conduit and along an extension of said second conduit so as to control a position of said glow discharge.

32. A gas reactor comprising:

a dielectric casing made of a dielectric material and having a first conduit formed therein for directing first gas;

an inner electrode provided inside said dielectric casing at a general center thereof and including at least one catalyst, said inner electrode having a second conduit formed therein for directing second gas and having at least one hole for ejecting said second gas;

an outer electrode surrounding an outer wall of said dielectric casing; and a power-supply unit applying AC power between said inner electrode and said outer electrode to generate glow discharge inside said dielectric casing, wherein said at least one hole is provided within an area where said glow discharge takes place.

* * * * *

UNITED STATES PATENT AND TRADEMARK OFFICE
CERTIFICATE OF CORRECTION

PATENT NO.: 6,027,617
DATED : February 22, 2000
INVENTOR(S): HAYASHI et al.

It is certified that an error appears in the above-identified patent and that said Letters Patent is hereby corrected as shown below:

On the title page of the patent in item [63], delete "Pat. No. 5,871,218" and insert --abandoned--.

Signed and Sealed this

Thirteenth Day of February, 2001

Attest:

NICHOLAS P. GODICI

Attesting Officer

Acting Director of the United States Patent and Trademark Office